United States Patent [19]
Dent et al.

[11] Patent Number: 5,353,352
[45] Date of Patent: Oct. 4, 1994

[54] MULTIPLE ACCESS CODING FOR RADIO COMMUNICATIONS

[75] Inventors: Paul W. Dent, Stehag, Sweden; Gregory E. Bottomley, Cary, N.C.

[73] Assignee: Ericsson GE Mobile Communications Inc., Research Triangle Park, N.C.

[21] Appl. No.: 866,865

[22] Filed: Apr. 10, 1992

[51] Int. Cl.$^5$ ............................................. H04K 1/00
[52] U.S. Cl. ........................................ 380/37; 375/1; 380/34
[58] Field of Search ................. 375/1; 380/34, 37, 36, 380/49, 50

[56] References Cited
U.S. PATENT DOCUMENTS

| | | |
|---|---|---|
| 4,052,565 | 10/1977 | Baxter et al. . |
| 4,134,071 | 1/1979 | Ohnsorge . |
| 4,293,953 | 10/1981 | Gutleber . |
| 4,455,662 | 6/1984 | Gutleber . |
| 4,470,138 | 9/1984 | Gutleber . |
| 4,568,915 | 2/1986 | Gutleber . |
| 4,644,560 | 2/1987 | Torre et al. . |
| 4,901,307 | 2/1990 | Gilhousen et al. . |
| 4,930,140 | 5/1990 | Cripps et al. . |
| 4,933,952 | 6/1990 | Albrieux et al. . |
| 4,984,247 | 1/1991 | Kaufmann et al. . |
| 5,022,049 | 6/1991 | Abrahamson et al. . |
| 5,048,057 | 9/1991 | Saleh et al. ............. 380/34 X |
| 5,048,059 | 9/1991 | Dent . |
| 5,056,109 | 10/1991 | Gilhousen et al. . |
| 5,060,266 | 10/1991 | Dent ......................... 380/49 |
| 5,091,942 | 2/1992 | Dent . |
| 5,101,501 | 3/1992 | Gilhousen et al. . |
| 5,103,459 | 4/1992 | Gilhousen et al. . |
| 5,109,390 | 4/1992 | Gilhousen et al. . |
| 5,136,612 | 8/1992 | Bi ............................. 375/1 |
| 5,151,919 | 9/1992 | Dent ......................... 375/1 |
| 5,159,608 | 10/1992 | Falconer et al. ........ 375/1 |

FOREIGN PATENT DOCUMENTS 336832 10/1989 European Pat. Off. .
2172777 9/1986 United Kingdom .

OTHER PUBLICATIONS

Tzannes, N. S., *Communication and Radar Systems*, N.J.: Prentice-Hall, Inc., 1985, pp. 227–239.
Stremler, F. G., *Introduction to Communication Systems*, Mass.: Addison-Wesley Publishing Co., 1982, pp. 406–418.
"Introduction to Spread-Spectrum Antimultipath Techniques and Their Application to Urban Digital Radio", G. Turin, Proceedings of the IEEE, vol. 68, No. 3, Mar. 1980.

(List continued on next page.)

*Primary Examiner*—Tod R. Swann
*Attorney, Agent, or Firm*—Burns, Doane, Swecker & Mathis

[57] ABSTRACT

Individual information signals encoded with a common block error-correction code are assigned a unique scrambling mask, or signature sequence, taken from a set of scrambling masks having selected correlation properties. The set of scrambling masks is selected such that the correlation between the modulo-2 sum of two masks with any codeword in the block code is a constant magnitude, independent of the mask set and the individual masks being compared. In one embodiment, when any two masks are summed using modulo-2 arithmetic, the Walsh transformation of that sum results in a maximally flat Walsh spectrum. For cellular radio telephone systems using subtractive CDMA demodulation techniques, a two-tier ciphering system ensures security at the cellular system level by using a pseudorandomly generated code key to select one of the scrambling masks common to all of the mobile stations in a particular cell. Also, privacy at the individual mobile subscriber level is ensured by using a pseudorandomly generated ciphering key to encipher individual information signals before the scrambling operation.

67 Claims, 9 Drawing Sheets

OTHER PUBLICATIONS

"A Communication Technique for Multipath Channels", R. Price et al., Proceedings of the IRE, Mar. 1958, pp. 555–570.

"Fading Channel Communications", P. Monsen, IEEE Communications Magazine, Jan. 1980, pp. 16–25.

Proakis, J. G., *Digital Communications*, N.Y.: McGraw-Hill 1989, pp. 728–739.

"Origins of Spread-Spectrum Communications", Scholtz, IEEE Transactions on Communications, vol. COM-30, No. 5, May 1982, pp. 18–21.

"Very Low Rate Convolutional Codes for Maximum Theoretical Performance of Spread-Spectrum Multiple-Access Channels" A Viterbi, IEEE Journal on Selected Areas in Communications, vol. 8, No. 4, May 1990.

MacWilliams, F., *The Theory of Error-Correcting Codes, Part I and II*, N.Y.: North-Holland, 1988, pp. 93–124, 451–465.

"A Class of Low-Rate Nonlinear Binary Codes", A. Kerdock, Information and Control, vol. 20, pp. 182–187 (1972).

Tatsuro Masamura, "Spread Spectrum Multiple Access System with Intrasystem Interference Cancellation," *Transactions on the Institute of Electronics, Information & Communication Engineers*, vol. E 71, No. 3, Mar. 1988, pp. 224–231.

Mahesh K. Varanasi et al., "An Iterative Detector for Asynchronous Spread-Spectrum Multiple-Access Systems," *Proceedings of the IEEE Global Telecommunications Conference*, vol. 1, Nov. 28–Dec. 1, 1988, pp. 556–560.

Ryuji Kohno et al., "Adaptive Cancellation of Interference in Direct-Sequence Spread-Spectrum Multiple Access Systems," *Proceedings of the IEEE/IEICE Global Telecommunications Conference*, vol. 1, Nov. 15–18, 1987, pp. 630–634.

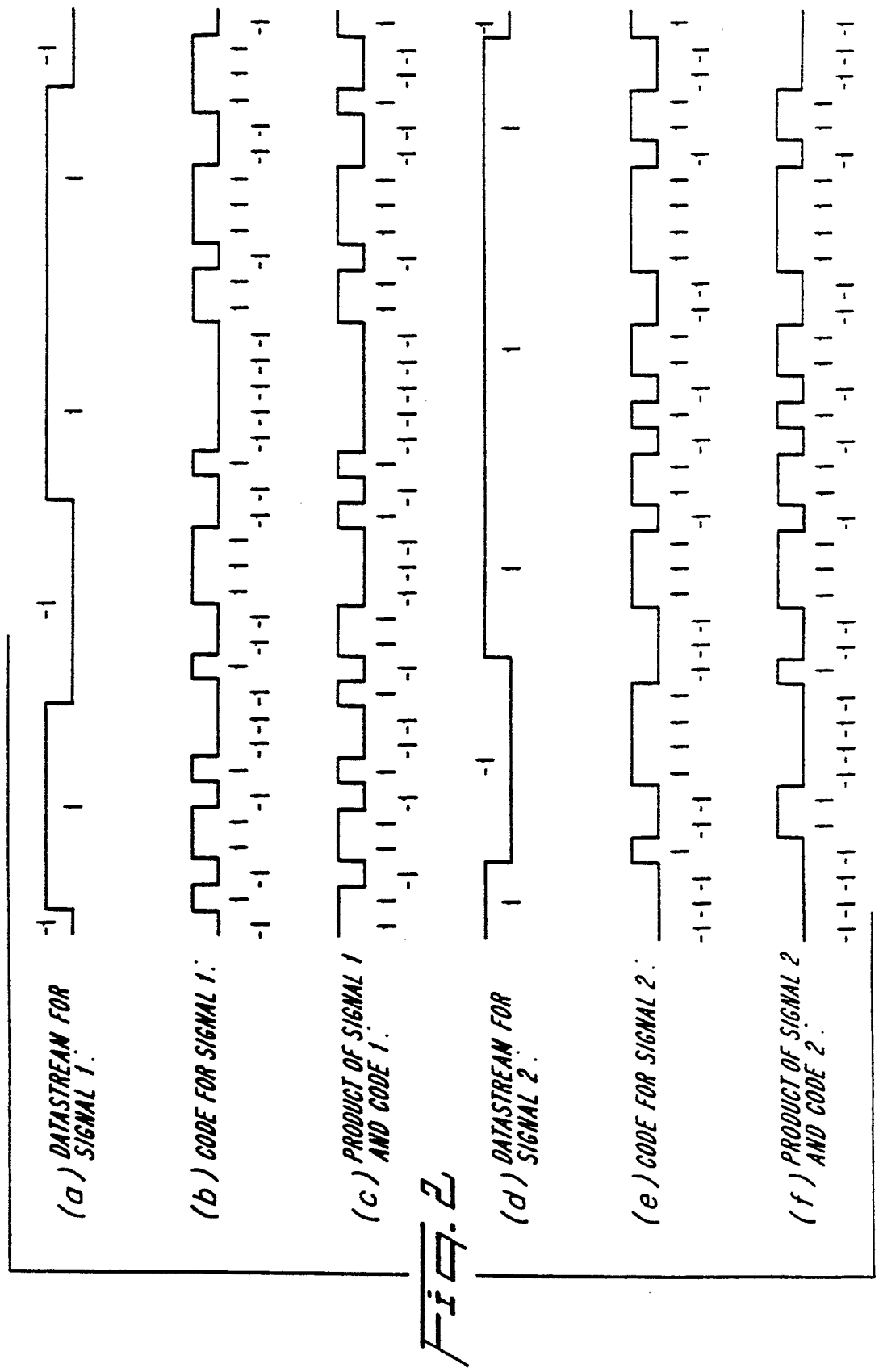

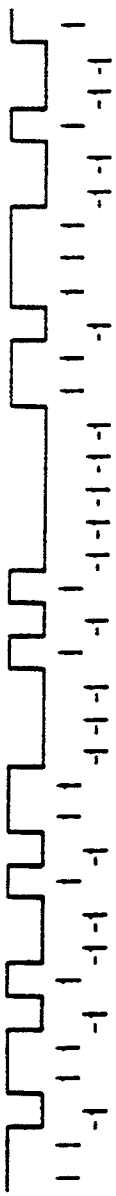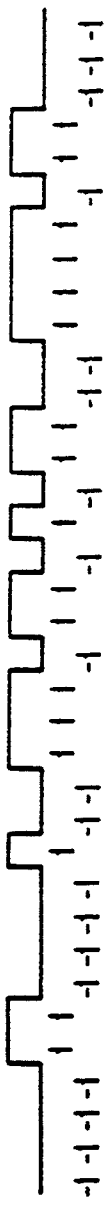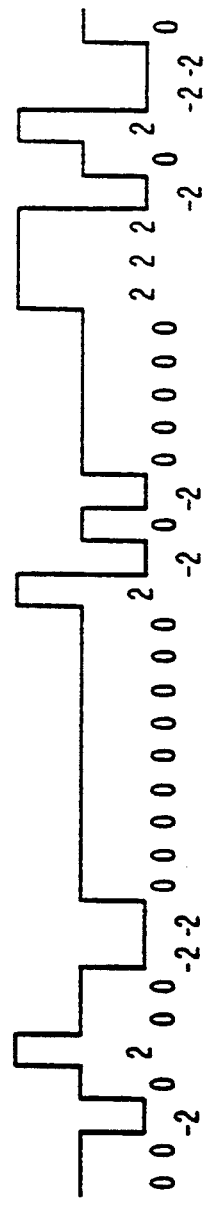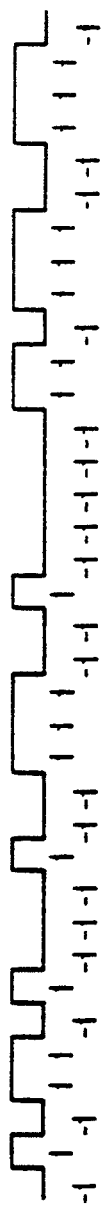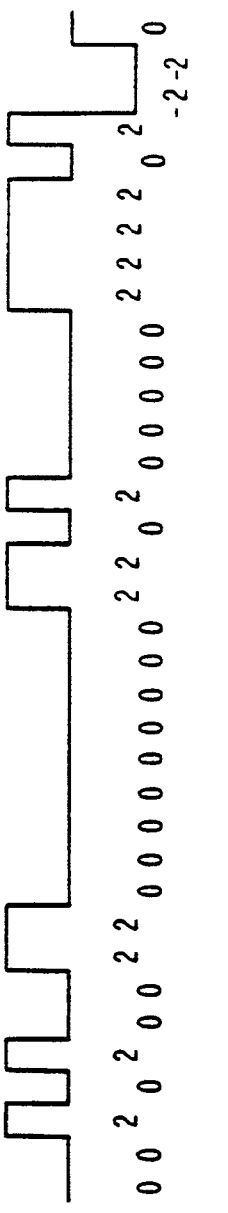
Fig. 3

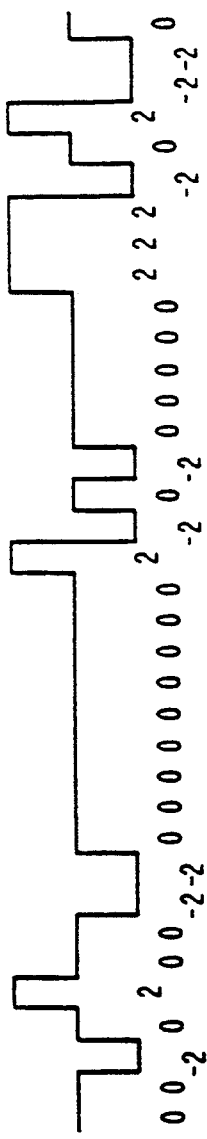
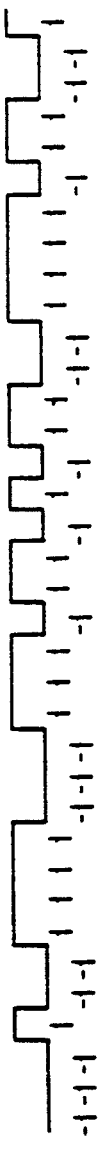
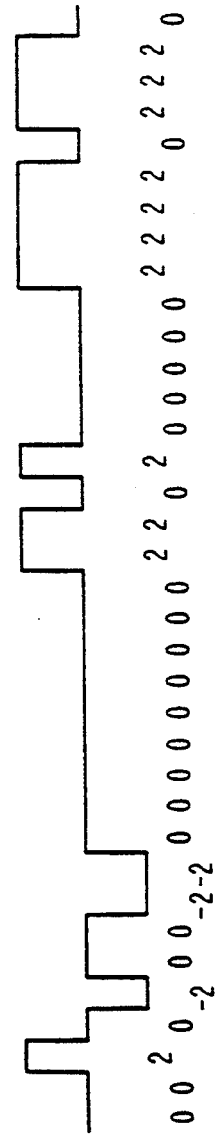
Fig. 4

MULTIPLE ACCESS CODING FOR RADIO COMMUNICATIONS

The present invention relates to the use of Code Division Multiple Access (CDMA) communications techniques in radio telephone communication systems, and more particularly, to an enhanced CDMA encoding scheme involving scrambling sequences for distinguishing and protecting information signals in a spread spectrum environment.

BACKGROUND

The cellular telephone industry has made phenomenal strides in commercial operations in the United States as well as the rest of the world. Growth in major metropolitan areas has far exceeded expectations and is outstripping system capacity. If this trend continues, the effects of rapid growth will soon reach even the smallest markets. Innovative solutions are required to meet these increasing capacity needs as well as maintain high quality service and avoid rising prices.

Throughout the world, one important step in cellular systems is to change from analog to digital transmission. Equally important is the choice of an effective digital transmission scheme for implementing the next generation of cellular technology. Furthermore, it is widely believed that the first generation of Personal Communication Networks (PCNs) employing low cost, pocket-size, cordless telephones that can be carried comfortably and used to make or receive calls in the home, office, street, car, etc. would be provided by cellular carriers using the next generation of digital cellular system infrastructure and cellular frequencies. The key feature demanded of these new systems is increased traffic capacity.

Currently, channel access is achieved using Frequency Division Multiple Access (FDMA) and Time Division Multiple Access (TDMA) methods. As illustrated in FIG. 1(a), in FDMA, a communication channel is a single radio frequency band into which a signal's transmission power is concentrated. Interference with adjacent channels is limited by the use of bandpass filters that only pass signal energy within the filters' specified frequency bands. Thus, with each channel being assigned a different frequency, system capacity is limited by the available frequencies as well as by limitations imposed by channel reuse.

In TDMA systems, as shown in FIG. 1(b), a channel consists of a time slot in a periodic train of time intervals over the same frequency. Each period of time slots is called a frame. A given signal's energy is confined to one of these time slots. Adjacent channel interference is limited by the use of a time gate or other synchronization element that only passes signal energy received at the proper time. Thus, the problem of interference from different relative signal strength levels is reduced.

Capacity in a TDMA system is increased by compressing the transmission signal into a shorter time slot. As a result, the information must be transmitted at a correspondingly faster burst rate that increases the amount of occupied spectrum proportionally. The frequency bandwidths occupied are thus larger in FIG. 1(b) than in FIG. 1(a).

With FDMA or TDMA systems or hybrid FDMA/TDMA systems, the goal is to ensure that two potentially interfering signals do not occupy the same frequency at the same time. In contrast, Code Division Multiple Access (CDMA) allows signals to overlap in both time and frequency, as illustrated in FIG. 1(c). Thus, all CDMA signals share the same frequency spectrum. In both the frequency and the time domain, the multiple access signals overlap. Various aspects of CDMA communications are described in "On the Capacity of a Cellular CDMA System," by Gilhousen, Jacobs, Viterbi, Weaver and Wheatley, *IEEE Trans, on Vehicular Technology*, May 1991.

In a typical CDMA system, the informational datastream to be transmitted is impressed upon a much higher bit rate datastream generated by a pseudorandom code generator. The informational datastream and the high bit rate datastream are typically multiplied together. This combination of higher bit rate signal with the lower bit rate datastream is called coding or spreading the informational datastream signal. Each informational datastream or channel is allocated a unique spreading code. A plurality of coded information signals are transmitted on radio frequency carrier waves and jointly received as a composite signal at a receiver. Each of the coded signals overlaps all of the other coded signals, as well as noise-related signals, in both frequency and time. By correlating the composite signal with one of the unique spreading codes, the corresponding information signal is isolated and decoded.

There are a number of advantages associated with CDMA communication techniques. The capacity limits of CDMA-based cellular systems are projected to be up to twenty times that of existing analog technology as a result of the wideband CDMA system's properties such as improved coding gain/modulation density, voice activity gating, sectorization and reuse of the same spectrum in every cell. CDMA is virtually immune to multipath interference, and eliminates fading and static to enhance performance in urban areas. CDMA transmission of voice by a high bit rate encoder ensures superior, realistic voice quality. CDMA also provides for variable data rates allowing many different grades of voice quality to be offered. The scrambled signal format of CDMA completely eliminates cross-talk and makes it very difficult and costly to eavesdrop or track calls, insuring greater privacy for callers and greater immunity from air time fraud.

Despite the numerous advantages afforded by CDMA systems, the capacity of conventional CDMA systems is limited by the decoding process. Because so many different user communications overlap in time and frequency, the task of correlating the correct information signal with the appropriate user is complex. In practical implementations of CDMA communications, capacity is limited by the signal-to-noise ratio, which is essentially a measure of the interference caused by other overlapping signals as well as background noise. The general problem to be solved, therefore, is how to increase system capacity and still maintain system integrity and a reasonable signal-to-noise ratio. A specific aspect of that problem is how to optimize the process of distinguishing each coded information signal from all of the other information signals and noise-related interference.

Another issue to be resolved in CDMA systems is system security and individual subscriber privacy. Since all of the coded subscriber signals overlap, CDMA decoding techniques typically require that the specific codes used to distinguish each information signal be generally known. This public knowledge of the actual codes used in a particular cell invites eavesdropping.

SUMMARY

The encoding of individual information signals is simplified by encoding each signal with a common block error-correction code, which may be readily decoded using a correlation device such as a Fast Walsh Transform circuit. Each coded information signal is then assigned a unique scrambling mask, or signature sequence, taken from a set of scrambling masks having certain selected auto- and cross-correlation properties. These scrambling masks are ordered based on the signal strength of their respectively assigned coded information signals. To enhance the decoding process, the highest ordered scrambling masks are initially selected in sequence to descramble the received composite signal. In general terms, the scrambling mask set is selected such that the sum of any two scrambling masks, using modulo-2 arithmetic, is equally correlated in magnitude to all codewords of the common block error-correction code. For the case where the block error-correction code is a Walsh-Hadamard code, if any two scrambling masks are summed using modulo-2 arithmetic, and the binary values of the product are represented with $+1$ and $-1$ values, then the Walsh transform of that sum results in a maximally flat Walsh spectrum. Sequences with such a spectrum are sometimes referred to as "bent" sequences.

In the context of cellular radio telephone systems using subtractive CDMA demodulation techniques, the present invention incorporates a two-tier ciphering system to ensure security at the cellular system level and privacy at the individual mobile subscriber level. At the system level, a pseudorandomly generated code key is used to select one of the scrambling masks common to all of the mobile stations in a particular cell. At the subscriber level, a pseudorandomly generated ciphering key enciphers individual information signals before the scrambling operation.

BRIEF DESCRIPTION OF THE DRAWINGS

The present invention will now be described in more detail with reference to preferred embodiments of the invention, given only by way of example, and illustrated in the accompanying drawings, in which:

FIG. 2 shows a series of graphs illustrating how CDMA signals are generated;

FIGS. 3 and 4 show a series of graphs for illustrating how CDMA signals are decoded;

DETAILED DESCRIPTION

While the following description is in the context of cellular communications systems involving portable or mobile radio telephones and/or Personal Communication Networks (PCNs), it will be understood by those skilled in the art that the present invention may be applied to other communications applications. Moreover, while the present invention may be used in a subtractive CDMA demodulation system, it also may be used in applications of other types of spread spectrum communication systems.

Figure 1A:
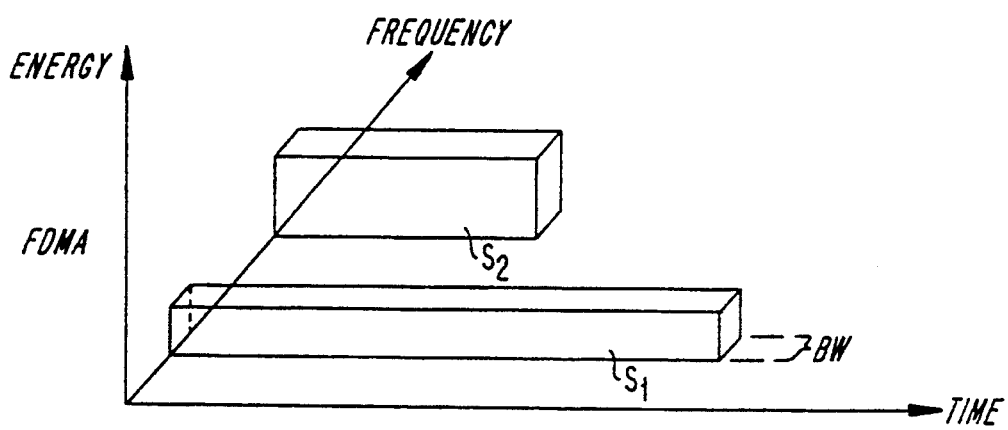
FIGS. 1(a)-(c) are plots of access channels using different multiple access techniques.
Figure 1B:
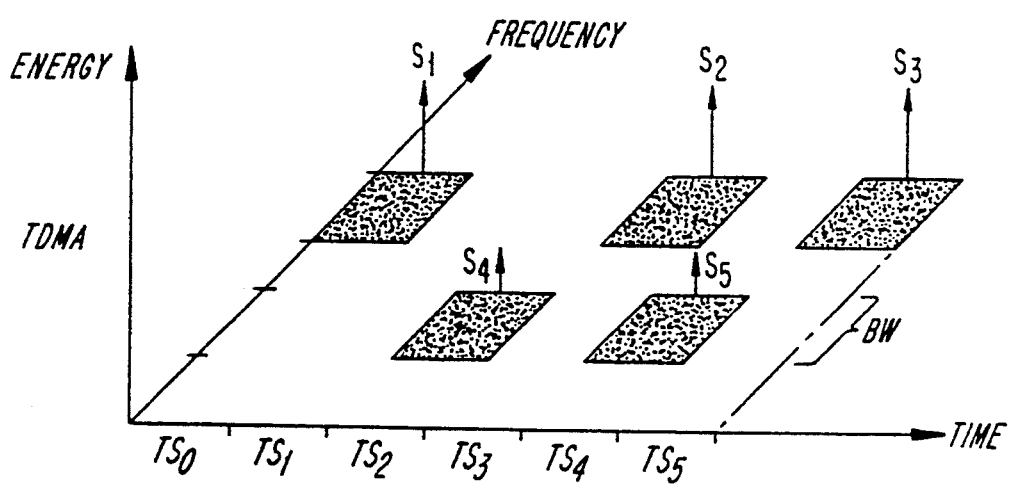
Figure 1C:
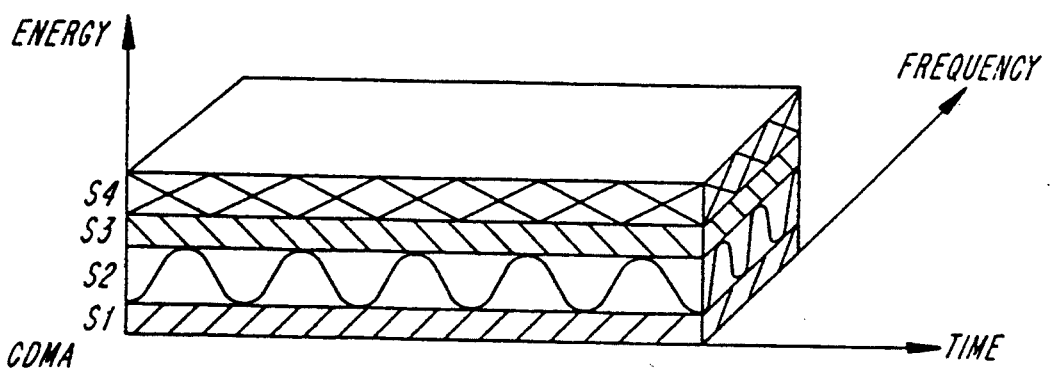
Figure 5:
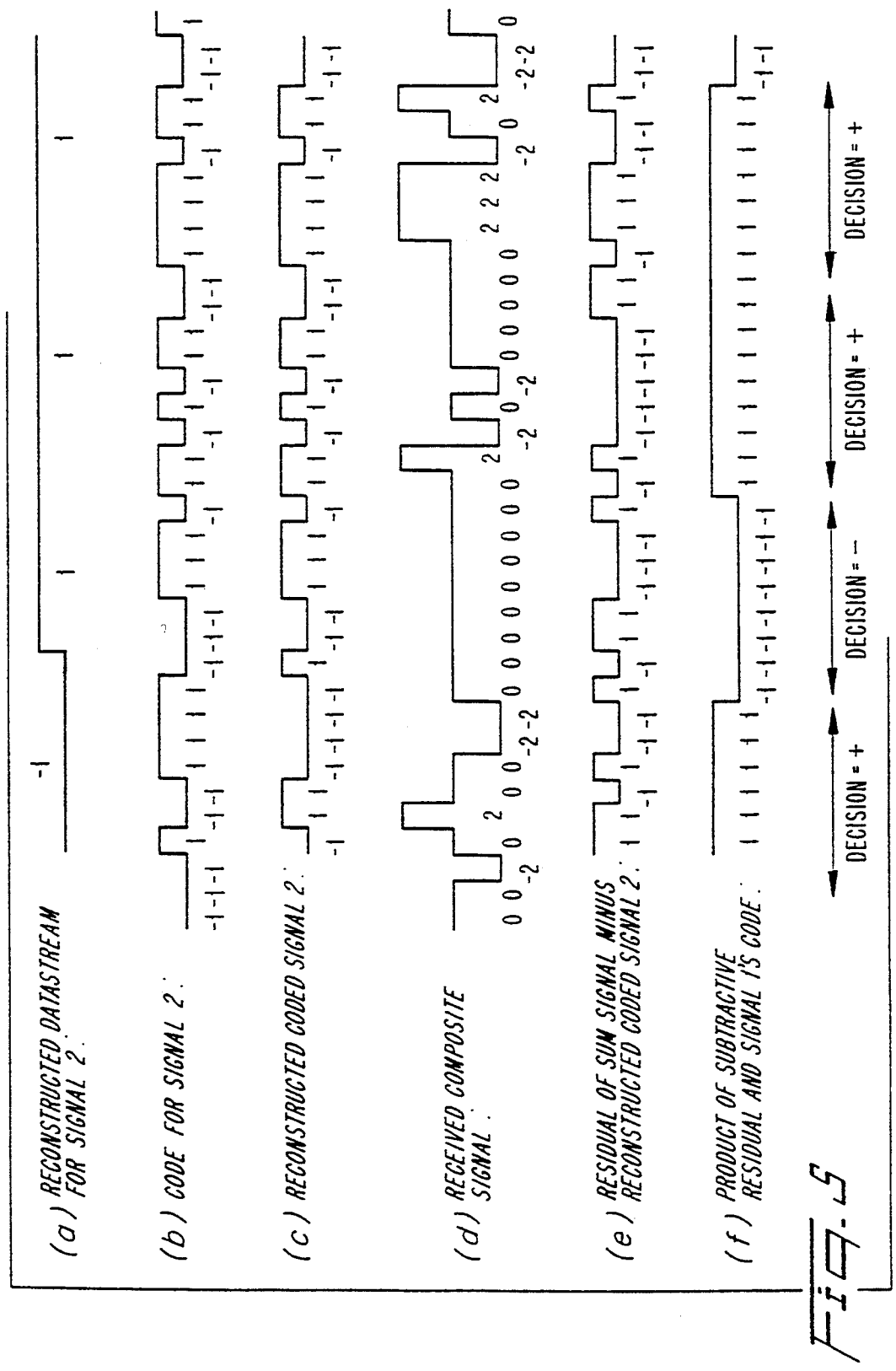
FIG. 5 shows a series of graphs illustrating a subtractive CDMA demodulation technique.

CDMA demodulation techniques will now be described in conjunction with the signal graphs shown in FIGS. 2-4 which set forth example waveforms in the coding and decoding processes involved in traditional CDMA systems. Using the waveform examples from FIGS. 2-4, the improved performance of a subtractive CDMA demodulation technique is illustrated in FIG. 5. Additional descriptions of conventional and subtractive CDMA demodulation techniques may be found in co-pending, commonly assigned U.S. patent application Ser. No. 07/628,359 filed on Dec. 17, 1990, which is incorporated herein by reference, and in co-pending, commonly assigned U.S. patent application Ser. No. 07/739,446 filed on Aug. 2, 1991, which is also incorporated herein by reference.

Two different datastreams, shown in FIG. 2 as signal graphs (a) and (d), represent digitized information to be communicated over two separate communication channels. Information signal 1 is modulated using a high bit rate, digital code that is unique to signal 1 and that is shown in signal graph (b). For purposes of this description, the term "bit" refers to a binary digit or symbol of the information signal. The term "bit period" refers to the time period between the start and the finish of one bit of the information signal. The term "chip" refers to a binary digit of the high rate code signal. Accordingly, the term "chip period" refers to the time period between the start and the finish of one chip of the code signal. Naturally, the bit period is much greater than the chip period. The result of this modulation, which is essentially the product of the two signal waveforms, is shown in the signal graph (c). In Boolean notation, the modulation of two binary waveforms is essentially an exclusive-OR operation. A similar series of operations is carried out for information signal 2 as shown in signal graphs (d)-(f). In practice, of course, many more than two coded information signals are spread across the frequency spectrum available for cellular telephone communications.

Each coded signal is used to modulate a radio frequency (RF) carrier using any one of a number of modulation techniques, such as Binary Phase Shift Keying (BPSK) or Quadrature Phase Shift Keying (QPSK). In a cellular telephone system, each modulated carrier is transmitted over an air interface. At a radio receiver, such as a cellular base station, all of the signals that overlap in the allocated frequency bandwidth are received together. The individually coded signals are added, as represented in the signal graphs (a)-(c) of FIG. 3, to form a composite signal waveform (graph (c)).

After demodulation of the received signal to the appropriate baseband frequency, the decoding of the composite signal takes place. Information signal 1 may be decoded or despread by multiplying the received composite signal shown in FIG. 3(c) with the unique code used originally to modulate signal 1 that is shown in signal graph (d). The resulting signal is analyzed to decide the polarity (high or low, $+1$ or $-1$, "1" or "0") of each information bit period of the signal. The details of how the receiver's code generator becomes time synchronized to the transmitted code are known in the art.

These decisions may be made by taking an average or majority vote of the chip polarities during each bit period. Such "hard" decision making processes are acceptable as long as there is no signal ambiguity. For example, during the first bit period in the signal graph (f), the average chip value is +1.00 which readily indicates a bit polarity +1. Similarly, during the third bit period, the average chip value is +0.75, and the bit polarity is also most likely a +1. However, in the second bit period, the average chip value is zero, and the majority vote or average test fails to provide an acceptable polarity value.

In such ambiguous situations, a "soft" decision making process must be used to determine the bit polarity. For example, an analog voltage proportional to the received signal after despreading may be integrated over the number of chip periods corresponding to a single information bit. The sign or polarity of the net integration result indicates that the bit value is a +1 or "1.

The decoding of signal 2, similar to that of signal 1, is illustrated in the signal graphs (a)–(d) of FIG. 4. However, after decoding, there are no ambiguous bit polarity situations.

Theoretically, this decoding scheme can be used to decode every signal that makes up the composite signal. Ideally, the contribution of unwanted interfering signals is minimized when the digital spreading codes are orthogonal to the unwanted signals. (Two binary sequences are orthogonal if they differ in exactly one half of their bit positions.) Unfortunately, only a certain number of orthogonal codes exist for a given word length. Another problem is that orthogonality can be maintained only when the relative time alignment between two signals is strictly maintained. In communications environments where portable radio units are moving constantly, such as in cellular systems, precise time alignment is difficult to achieve. When code orthogonality cannot be guaranteed, noise-based signals may interfere with the actual bit sequences produced by different code generators, e.g., the mobile telephones. In comparison with the originally coded signal energies, however, the energy of the noise signals is usually small.

"Processing gain" is a parameter of spread spectrum systems, and for a direct spreading system it is defined as the ratio of the spreading or coding bit rate to the underlying information bit rate, i.e., the number of chips per information bit or symbol. Thus, the processing gain is essentially the bandwidth spreading ratio, i.e., the ratio of the bandwidths of the spreading code and information signal. The higher the code bit rate, the wider the information is spread and the greater the spreading ratio. For example, a one kilobit per second information rate used to modulate a one megabit per second code signal has processing gain of 1000:1. The processing gain shown in FIG. 2, for example, is 8:1, the ratio of the code chip rate to the information datastream bit rate.

Large processing gains reduce the chance of decoding noise signals modulated using uncorrelated codes. For example, processing gain is used in military contexts to measure the suppression of hostile jamming signals. In other environments, such as cellular systems, processing gain helps suppress other, friendly signals that are present on the same communications channel but use codes that are uncorrelated with the desired code. In the context of the subtractive CDMA demodulation technique, "noise" includes both hostile and friendly signals, and may be defined as any signals other than the signal of interest, i.e., the signal to be decoded. Expanding the example described above, if a signal-to-interference ratio of 10:1 is required and the processing gain is 1000:1, conventional CDMA systems have the capacity to allow up to 101 signals of equal energy to share the same channel. During decoding, 100 of the 101 signals are suppressed to 1/1000th of their original interfering power. The total interference energy is thus 100/1000, or 1/10, as compared to the desired information energy of unity. With the information signal energy ten times greater than the interference energy, the information signal may be correlated accurately.

Together with the required signal-to-interference ratio, the processing gain determines the number of allowed overlapping signals in the same channel. That this is still the conventional view of the capacity limits of CDMA systems may be recognized by reading, for example, the above-cited paper by Gilhousen et al.

In contrast to conventional CDMA, an important aspect of the subtractive CDMA demodulation technique is the recognition that the suppression of friendly CDMA signals is not limited by the processing gain of the spread spectrum demodulator as is the case with the suppression of military type jamming signals. A large percentage of the other signals included in a received, composite signal are not unknown jamming signals or environmental noise that cannot be correlated. Instead, most of the noise, as defined above, is known and is used to facilitate decoding the signal of interest. The fact that the characteristics of most of these noise signals are known, including their corresponding spreading codes, is used in the subtractive CDMA demodulation technique to improve system capacity and the accuracy of the signal decoding process. Rather than simply decode each information signal from the composite signal, the subtractive CDMA demodulation technique also removes each information signal from the composite signal after it has been decoded. Those signals that remain are decoded only from the residual of the composite signal. Consequently, the already decoded signals do not interfere with the decoding of the remaining signals.

For example, in FIG. 5, if signal 2 has already been decoded as shown in the signal graph (a), the coded form of signal 2 can be reconstructed as shown in the signal graphs (b) and (c) (with the start of the first bit period of the reconstructed datastream for signal 2 aligned with the start of the fourth chip of the code for signal 2 as shown in FIG. 2 signal graphs (d) and (e)), and subtracted from the composite signal in the signal graph (d) (again with the first chip of the reconstructed coded signal 2 aligned with the fourth chip of the received composite signal) to leave coded signal 1 in the signal graph (e). This is easily verified by comparing signal graph (e) in FIG. 5 with signal graph (c) in FIG. 2 (truncated by removing the first three and the very last chip). Signal 1 is recaptured easily by multiplying the coded signal 1 with code 1 to reconstruct signal 1. Note that because the bit periods of datastreams for signals 1 and 2 are shifted relative to one another by 2 chips there are only six +1 chips in the first bit period of the recaptured signal 1 shown in FIG. 5 signal graph (f). It is significant that while the conventional CDMA decoding method was unable to determine whether the polarity of the information bit in the second bit period of signal 1 was a +1 or a −1 in signal graph (f) of FIG. 3, the decoding method of the subtractive CDMA demodulation technique effectively resolves that ambiguity simply by removing signal 2 from the composite signal.

Figure 6:
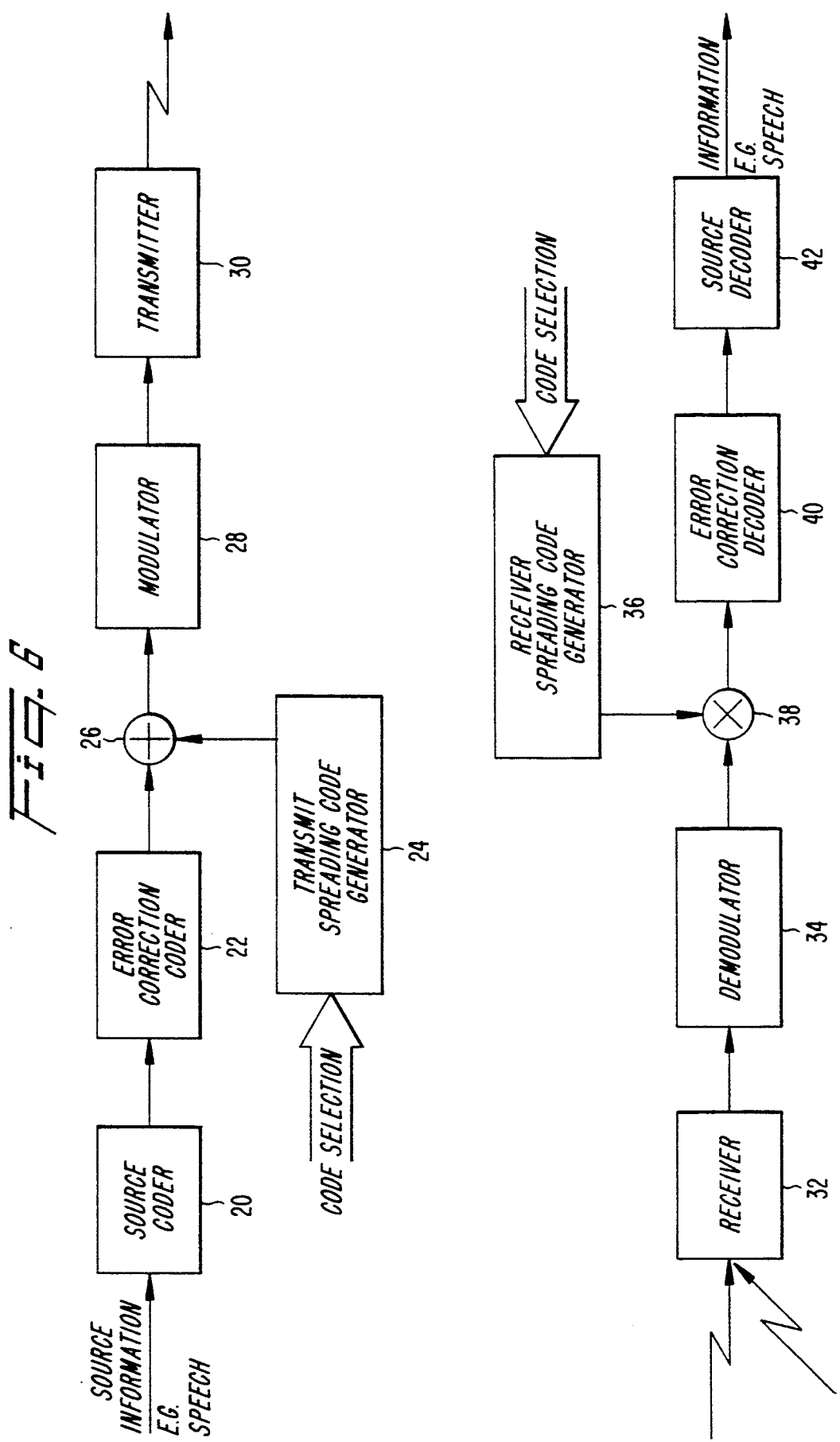
FIG. 6 is a generalized schematic showing a spread spectrum communications system.

A general CDMA system will now be described in conjunction with FIG. 6. An information source such as speech is converted from analog format to digital format in a conventional source coder 20. The digital bitstream generated by the transmitter source coder 20 may be further processed in a transmitter error correction coder 22 that adds redundancy which increases the bandwidth or bit rate of the transmission. In response to a spreading code selection signal from a suitable control mechanism such as a programmable microprocessor (not shown), a particular spreading code is generated by a transmit spreading code generator 24, which as described above may be a pseudorandom number generator. The selected spreading code is summed in a modulo-2 adder 26 with the coded information signal from the error correction coder 22. It will be appreciated that the modulo-2 addition of two binary sequences is essentially an exclusive-OR operation in binary logic. The modulo-2 summation effectively "spreads" each bit of information from the coder 22 into a plurality of "chips".

The coded signal output by the adder 26 is used to modulate a radio frequency (RF) carrier using any one of a number of modulation techniques, such as QPSK, in a modulator 28. The modulated carrier is transmitted over an air interface by way of a conventional radio transmitter 30. A plurality of the coded signals overlapping in the allocated frequency band are received together in the form of a composite signal waveform at a radio receiver 32, such as a cellular base station. After demodulation in a demodulator 34 to baseband, the composite signal is decoded.

An individual information signal is decoded or "despread" by multiplying the composite signal with the corresponding unique spreading code produced by a receiver spreading code generator 36. This unique code corresponds to that spreading code used originally to spread that information signal in the transmit spreading code generator 24. The spreading code and the demodulated signal are combined by a multiplier 38. Because several received chips represent a single bit of transmitted information, the output signal of multiplier 38 may be successively integrated over a particular number of chips in order to obtain the actual values of the information bits. As described above, these bit value decisions may be made by taking an average or majority vote of the chip polarities during each bit period. In any event, the output signals of multiplier 38 are eventually applied to a receiver error correction decoder 40 that reverses the process applied by the transmitter error correction coder 22, and the resulting digital information is converted into analog format (e.g., speech) by a source decoder 42.

As described above, this decoding scheme theoretically can be used to decode every signal in the composite signal. Ideally, the contribution of unwanted, interfering signals is minimized when the digital spreading codes are orthogonal to these unwanted signals and when the relative timing between the signals is strictly maintained.

In a preferred embodiment of the present invention, the error correction coding is based on orthogonal or bi-orthogonal block coding of the information to be transmitted. In orthogonal block coding, a number of bits M to be transmitted are converted to one of $2^M$ $2^M$-bit orthogonal codewords. Decoding an orthogonal codeword involves correlation with all members of the set of $N=2^M$ codewords. The binary index of the codeword giving the highest correlation yields the desired information. For example, if a correlation of sixteen 16-bit codewords numbered 0-15 produces the highest correlation on the tenth 16-bit codeword, the underlying information signal is the 4-bit binary codeword 1010 (which is the integer 10 in decimal notation, hence, the index of 10). Such a code is also termed a [16,4] orthogonal block code and has a spreading ratio $R=16/4=4$. By inverting all of the bits of the codewords, one further bit of information may be conveyed per codeword. This type of coding is known as bi-orthogonal block coding.

A significant feature of such coding is that simultaneous correlation with all the orthogonal block codewords in a set may be performed efficiently by means of a Fast Walsh Transform (FWT) device. In the case of a [128,7] block code, for example, 128 input signal samples are transformed into a 128-point Walsh spectrum in which each point in the spectrum represents the value of the correlation of the input signal samples with one of the codewords in the set. A suitable FWT processor is described in co-pending, commonly assigned U.S. patent application Ser. No. 735,805 filed on Jul. 25, 1991, which is incorporated here by reference.

In accordance with one aspect of the present invention, the coding is unique for each information signal by using a different binary mask, also called a scrambling mask or a signature sequence, to scramble each block-coded information signal. Using module-2 addition, such a scrambling mask may be added to the already block-coded information and the result transmitted. That same scrambling mask is used subsequently at the receiver to descramble that information signal from the composite signal.

It will be appreciated that maximal length sequences, also known as m-sequences, have been used for scrambling masks. Maximal length sequences are the sequences of maximum period that can be generated by a k-stage binary shift register with linear feedback. The maximum period of a binary sequence produced by such a shift register is $2^k-1$ bits. Since a scrambling mask usually consists of one period of such a sequence, maximum period implies maximum length. Maximal length pseudorandom scrambling masks have the useful auto-correlation property that each mask has a correlation of unity with itself unshifted and $-1/N$ with any bitshift of itself, where N is the number of bits, or length, of the scrambling mask. In principle, different shifts of a maximal length sequence could be used to obtain scrambling masks for a number of spread-spectrum signals, provided that those signals were accurately time-synchronized to one another to preserve the desired relative bitshifts. Unfortunately, it is usually impractical to arrange transmissions from a number of mobile stations to be received at a base station with relative time alignment accuracy of better than ± several chips. (In the examples of CDMA demodulation shown in FIGS. 2–5, the bit periods of the datastreams for signals 1 and 2 were shifted by two chips relative to each other.) Under these conditions, maximal length sequences are not adequate scrambling masks because a time alignment error of one mask may cause it to appear exactly like another mask.

Gold codes may be used to accommodate the time-alignment problem. Gold codes are sequences that have minimum mutual cross-correlation not only when time-aligned but also when the time alignment is shifted by several bits. This property is only achieved, however, when the underlying source information is either 000000 . . . 00 or 111111 . . . 11 over the whole code sequence. Because block coding is used to spread the signal, not the scrambling mask, the underlying information bits form a codeword of varying bit values. Thus, the desired mutual cross-correlation properties can not be obtained in a useful communication system.

The deficiencies of the prior art approaches are resolved by the present invention. Code bits emerging from a transmitter error correction coder are combined with one of a set of scrambling masks. Where the error correction coder uses orthogonal block coding, a block of M information bits is coded using one of $2^M$ codewords of $2^M$ bits in length. The present invention also is applicable to bi-orthogonal block coding in which $M+1$ bits are coded using one of the $2^M$ codewords (of $2^M$ bits in length) or their inverses (also of $2^M$ bits in length). According to the present invention, the scrambling masks are designed to minimize the cross-correlation of any orthogonal codeword masked by a first scrambling mask with any orthogonal codeword masked by any other scrambling mask.

As discussed above, orthogonal and bi-orthogonal block codes may be decoded conveniently using an FWT circuit that correlates a composite signal with all possible $N=2^M$ codewords of an input block of $N=2^M$ signal samples. The FWT is an information-lossless process that may be inverted to recompute the original information signal samples from the correlations. Like the Fourier Transform, the FWT satisfies Parseval's theorem in that 1/N times the sum of the squares of the input samples equals the sum of the squares of the computed correlations. For an input sequence of $\pm 1$ values, the correlations take on values between $-1$ and 1. Decoding an orthogonally coded information signal involves determining which of the correlations computed by the FWT circuit has the largest value, the binary index of the largest correlation representing the decoded information bits. When decoding a bi-orthogonally coded information signal, the correlation with the largest magnitude is determined, giving an index corresponding to all but one of the information bits. The final information bit is determined from the sign of the largest-magnitude correlation.

The goal of minimizing errors due to interference from overlapping signals means that the interference signals should not transform to generate one or more large correlations that could be mistaken for the desired signal to be decoded. Rather, the interference signals should transform such that they are evenly spread, i.e., have the same magnitude, over all correlations. This condition of evenly spread correlations may be called a flat Walsh spectrum. A more mathematical definition provides that if the interference energy is normalized to unity, (viz., 1/N times the sum of the squares of the input samples is unity) each of the computed correlations has the same value $\pm 1/N^{\frac{1}{2}}$.

Scrambling masks that result in interfering signals exhibiting a flat Walsh spectrum when decoded using a different scrambling mask can only be obtained when $N^{\frac{1}{2}}$ is an integer and N is an even power of two (i.e., $N=2^{2Z}$, where $Z=1, 2, 3, \ldots$ ), e.g., 4, 16, 64, etc. Systematic ways of constructing scrambling masks that generate flat Walsh spectra are described below.

The scrambling masks to be constructed have the same length as the orthogonal codewords to which they are modulo-2 added. When a unique scrambling mask is modulo-2 added to all N codewords in a Walsh-Hadamard code set, the result is a unique set of N "scrambled" codewords that forms a coset of the original Walsh-Hadamard code set (i.e., another code set). The scrambling masks are chosen such that the correlation between scrambled codewords of different cosets is constant in magnitude, independent of which two cosets are being compared and independent of which scrambled codewords within the two code sets are being compared.

To achieve this property, the modulo-2 sum of any two scrambling masks must be a "bent" sequence. As mentioned above, bent sequences are sequences having a flat Walsh transform, i.e., sequences that are equally correlated in magnitude to all N possible Walsh-Hadamard codewords. See, e.g., F. MacWilliams and N. Sloane, *The Theory of Error-Correcting Codes, Parts I and II*, (New York: North-Holland, 1977). A set of scrambling masks having this property may be called an "ideal" set.

The present invention encompasses two methods for creating ideal scrambling mask sets. The first method, Method A, produces a set of $N^{\frac{1}{2}}$ scrambling masks of length N. The second method, Method B, produces a set of N/2 scrambling masks of length N.

METHOD A

Let $n=N^{\frac{1}{2}}$; let $w_0, w_1, \ldots, w_{n-1}$ be the n Walsh-Hadamard codewords of length n; and let $k=\log_2(n)$. The set of scrambling masks is formed using the following procedure.

1. Select a primitive polynomial p(X) over Galois field GF(2) of degree k from, for example, R. Marsh, "Table of Irreducible Polynomials over GF(2) through Degree 19", National Security Agency, Washington, D.C. (1957) or W. Peterson, *Error-Correcting Codes*, (New York: John Wiley & Sons, 1961). If $k=1$, step 1 can be omitted.

For example, for $n=4$ and $k=2$, $p(X)=1+X+X^2$.

2. Use p(X) to define a Galois field $GF(2^k)$ with primitive element "a" such that $p(a)=0$. The Galois field $GF(2^k)$ consists of $n=2^k$ elements: 0, 1, a, $a^2$, $a^3, \ldots, a^{n-2}$. If $k=1$, form the standard Galois field GF(2) with elements 0 and 1.

For the example above in which $n=4$, the $GF(2^2)$ is formed with elements (0, 1, a, $a^2$), where $p(a)=0$ defines the element "a".

3. Form the sequence: $\{1, a, a^2, a^3, \ldots, a^{n-2}\}$ consisting of $n-1=2^k-1$ elements of the Galois field $GF(2^k)$, namely, all elements except zero. (For $k=1$, this is $\{1\}$.)

For the n=4 example, this gives the sequence $\{1, a, a^2\}$.

4. Replace each element in the sequence with its polynomial representation, giving the sequence:

$\{b^1(a)=1, b^a(a)=a, b^{a^2}(a)=a^2, \ldots, b^{a^{n-2}}(a)=a^{n-2}\}.$

This can be done as follows. Each of the elements in $GF(2^k)$ can be expressed as a polynomial in "a" of degree $k-1$: $b_0+b_1a+\ldots+b_{k-1}a^{k-1}$. The coefficients ($b_0, b_1, \ldots, b_{k-1}$) give the "k-tuple" representation of an element in $GF(2^k)$.

Consider the n=4 example above. The fact that p(a)=0 gives:

$$0 = 1 + a + a^2$$

or $$a^2 = -1 - a = 1 + a$$

since + and − are equivalent in modulo-2 arithmetic. Thus, for this example, the sequence {1, a, a²} would be replaced with {1, a, 1+a}.

5. Evaluate each polynomial representation in the sequence with a=2, using normal integer arithmetic. This gives a sequence of the integers 1, 2, ... n−1, not necessarily in that order.

For the n=4 example above, this gives the sequence {1, 2, 3}.

6. Interpreting each integer as an index of a Walsh-Hadamard codeword, replace each integer (index) in the sequence with the n-bit Walsh-Hadamard codeword of that index. This gives an ((n−1)n)-bit sequence.

For the n=4 example above, the Walsh-Hadamard codewords are: $w_1=0101$, $w_2=0011$, and $w_3=0110$, and this gives the 12-bit sequence: {0101, 0011, 0110} or {010100110110}.

7. A further n−2 such sequences are obtained by simply circularly rotating (or circularly permuting) left one shift at a time the sequence in step 5 and repeating step 6. (This is equivalent to circularly rotating left n shifts at a time the sequence in step 6.)

For the n=4 example, this gives two additional sequences:

{0011,0110,0101} = {001101100101}, for {2,3,1}; and

{0110,0101,0011} = {011001010011}, for {3,1,2}.

8. Extend the length of the sequences from steps 6 and 7 to $n^2 = N$ bits by inserting in front of each sequence the n-bit Walsh-Hadamard codeword $w_0$, which consists of n zeroes.

For the n=4 example, this gives the three 16-bit sequences:

{0000010100110110}, {0000001101100101}, and {0000011001010011}.

9. The set of n−1 n²-bit sequences is augmented with the all-zero sequence, which consists of n² zeroes. For the n=4 example above, this is the 16-bit sequence {0000000000000000}.

10. Having constructed n sequences of length n², these may be converted into a set of n scrambling masks by modulo-2 adding a "base" sequence of n² bits. These scrambling masks form a set of n (i.e., $N^{\frac{1}{2}}$) scrambling masks of length n² (i.e., N).

The base sequence can be chosen so that the scrambled information signals have desired auto-correlation properties, as well as cross-correlation properties, when echoes or time misalignments are present. Also, in the case of cellular mobile radio communication, a different base sequence can be assigned to different cells. In this case, correlation properties between different base station sequences would be considered.

For the n=4 example, suppose the base sequence is {0000111100001111}. The resulting set of scrambling masks is given by:

{0000 1010 0011 1001}
{0000 1100 0110 1010}
{0000 1001 0101 1100}
{0000 1111 0000 1111}.

This completes Method A for constructing an ideal set of $N^{\frac{1}{2}}$ scrambling masks of length N.

METHOD B

In Method B, a set of N/2 scrambling masks of length N is formed. The method is based on the use of N/2 of the $N^2$ codewords of length N which make up a Kerdock code. These codewords are permuted, then added to a common base sequence as in step 10 of Method A. A Kerdock code is a "supercode" in that it consists of N/2 code sets, each of which is a bi-orthogonal code. With the right permutation, the permuted Kerdock code contains the Walsh-Hadamard code as well as (N/2−1) cosets of the Walsh-Hadamard code. It will be recalled that a coset is obtained by applying a scrambling mask to all codewords in a set.

A Kerdock code is formed by the union of a cyclic form, first-order Reed-Muller code set with (N/2−1) cosets as described in the book by MacWilliams and Sloane mentioned above. Thus, it consists of N/2 code sets, each containing 2N bi-orthogonal codewords of length N, giving rise to a total of (N/2)(2N)=$N^2$ codewords of length N. By permuting each codeword in a certain way, the Kerdock code has the property that the modulo-2 sum of a codeword from one code set with a codeword from another code set is a bent sequence.

The procedure for generating the N/2 scrambling masks of length N is as follows:

1. Generate the N/2 code set representatives (CSRs) of a Kerdock code. A method for generating the entire Kerdock code is given in A. Kerdock, "A Class of Low-Rate Nonlinear Codes," *Info. and Control*, vol. 20, pp. 182-187 (1972) and in the above-cited MacWilliams and Sloane text at pp. 456-457.

A method which generates the code set representatives (CSRs) directly is given in the MacWilliams and Sloane text at pp. 457-459. This method generates the left half (N/2 bits) and right half (N/2 bits) of each CSR separately. Each N-bit CSR ($csr_j$) has the form:

$$csr_j = |0| x^j \left( \sum_{i=1}^{t} \theta_{L_i}^* \right) |0| x^j \left( \theta_1^* + \sum_{i=1}^{t} \theta_{L_i}^* \right) |$$

where $|A|B|C|D|$ denotes the concatenation of A (1 bit), B (N/2−1 bits), C (1 bit), and D (N/2−1 bits) into one sequence; $x^j()$ denotes the operation of cyclically right shifting j places what is within the parentheses; $L_i = 1 + 2^i$; $t = (\log_2(N) - 2)/2$; and $\theta_k^*$ denotes a special primitive idempotent polynomial (which can be interpreted as a sequence) of length N/2−1 as defined in the above-mentioned MacWilliams and Sloane text. Observe that the left half of the CSR consists of $|A|B|$ and the right half consists of $|C|D|$. The $csr_0$ is defined as the all-zero sequence.

It is important to note that the special primitive idempotent polynomials are based on a Galois field GF($2^r$=N/2), where r=$\log_2$(N/2). Thus, a GF(N/2) is used to form each half of the Kerdock code set representative.

For example, suppose N=16, N/2=8, r=3, and t=1. Then the special idempotent polynomials (and hence series) are given in the above-mentioned MacWilliams and Sloane text to be:

$\theta_1^* = 1+X^3+X^5+X^6 = \{1001011\}$ $\theta_3^* = 1+X^1+X^2+X^4 = \{1110100\}$ so that, with modulo-2 arithmetic:

$\theta_1^* + \theta_3^* = \{0111111\}$.

Thus, each CSR has the form:

$csr_j = |0|x^j(\theta_3^*)|0|x^j(\theta_1^* + \theta_3^*)|$
$= |0|x^j(\{1110100\})|0|x^j(\{0111111\})|$ Evaluating this expression for j=0, 1, ..., N/2−1 gives the eight CSRs in the following Table 1.

TABLE 1
Example of 16-bit Kerdock CSRs

| representative | sequence |
|---|---|
| 0 | 0000 0000 0000 0000 |
| 1 | 0011 1010 0101 1111 |
| 2 | 0001 1101 0110 1111 |
| 3 | 0100 1110 0111 0111 |
| 4 | 0010 0111 0111 1011 |
| 5 | 0101 0011 0111 1101 |
| 6 | 0110 1001 0111 1110 |
| 7 | 0111 0100 0011 1111 |

2. Permute each (N/2-bit) half of each Kerdock CSR to obtain the left and right halves of a permuted sequence.

The permutation is based on the primitive element "a" in the Galois field GF(N/2) used to form each half of the Kerdock CSRs. The permutation is defined by forming the Galois field elements in the order 0, 1, a, $a^2$, ..., $a^{N/2-2}$. These correspond to the positions 0 through N/2−1 in each half of the Kerdock CSR. The corresponding position in the permuted sequence is obtained by expressing each element as an r-tuple, where r=$\log_2$(N/2). The r-tuple has the form $b_0 + b_1 a + ... + b_{r-1} a^{r-1}$. By interpreting the coefficients $b_0$ through $b_{r-1}$ as coefficients of powers of 2 (i.e., $b_0 + 2b_1 + 4b_2 + ... + 2^{r-1} b_{r-1}$), an integer in the range [0, N/2−1] results (with $b_s$=0 or 1, for all s), the coefficients $b_s$, providing a binary representation of the integer which gives the corresponding position in each half of the permuted sequence. Note that the binary number for the corresponding position is just $b_{r-1} b_{r-2} ... b_2 b_1 b_0$.

For the example above, the primitive element "a" in GF(8) used to form the Kerdock code is defined by the primitive polynomial p(X)=$X^3+X+1$, which gives 3-tuple representations of the elements in GF(8) given in Table 2 (see the above-mentioned MacWilliams and Sloane text, page 110). Using the approach described above, the permutation mapping for each half of the sequence giving the corresponding new position in the permuted sequence is also shown in the following Table 2 (which is easily verified by reading the 3-tuples backwards).

TABLE 2
GF(8) and Half Sequences Permutations

| field element | 3-tuple form | old position | new position |
|---|---|---|---|
| 0 | 000 | 0 | 0 |
| 1 | 100 | 1 | 1 |
| a | 010 | 2 | 2 |
| $a^2$ | 001 | 3 | 4 |
| $a^3$ | 110 | 4 | 3 |
| $a^4$ | 011 | 5 | 6 |
| $a^5$ | 111 | 6 | 7 |
| $a^6$ | 101 | 7 | 5 |

Applying the permutations to each Kerdock CSR in Table 1 gives the set of permuted sequences in the following Table 3.

TABLE 3
Set of 16-bit Permuted Sequences

| index | sequence |
|---|---|
| 0 | 0000 0000 0000 0000 |
| 1 | 0011 1001 0101 1111 |
| 2 | 0001 1110 0111 0111 |
| 3 | 0101 0011 0110 1111 |
| 4 | 0010 0111 0111 1101 |
| 5 | 0100 1101 0111 1110 |
| 6 | 0111 0100 0111 1011 |
| 7 | 0110 1010 0011 1111 |

3. Having constructed N/2 permuted sequences of length N, these may be converted into N/2 scrambling masks by modulo-2 adding a "base" sequence of N bits. As in Method A, the base sequence can be chosen so that the scrambled information signals have desired auto-correlation properties, as well as cross-correlation properties, when echoes or time misalignments are present. Also, in the case of cellular mobile radio communication, a different base sequence can be assigned to different cells. In this case, correlation properties between different base station sequences would be considered.

For the example above, suppose the arbitrary base sequence is {0000111100001111}. The resulting set of scrambling masks is given in Table 4.

TABLE 4
Set of 16-bit Scrambling Masks

| index | sequence |
|---|---|
| 0 | 0000 1111 0000 1111 |
| 1 | 0011 0110 0101 0000 |
| 2 | 0001 0001 0111 1000 |
| 3 | 0101 1100 0110 0000 |
| 4 | 0010 1000 0111 0010 |
| 5 | 0100 0010 0111 0001 |
| 6 | 0111 1011 0111 0100 |
| 7 | 0110 0101 0011 0000 |

This completes Method B for forming an ideal set of N/2 scrambling masks of length N.

It will be understood that the scrambling mask Methods A and B give masks having good cross-correlation properties when two signal waveforms are time-aligned, regardless of the base sequence, or mask, chosen. The base mask can provide good auto-correlation properties, which is important when echoes of a signal are present. The base mask can also provide good cross-correlation properties when two signals are not time-aligned, or echoes are present.

Figure 7:
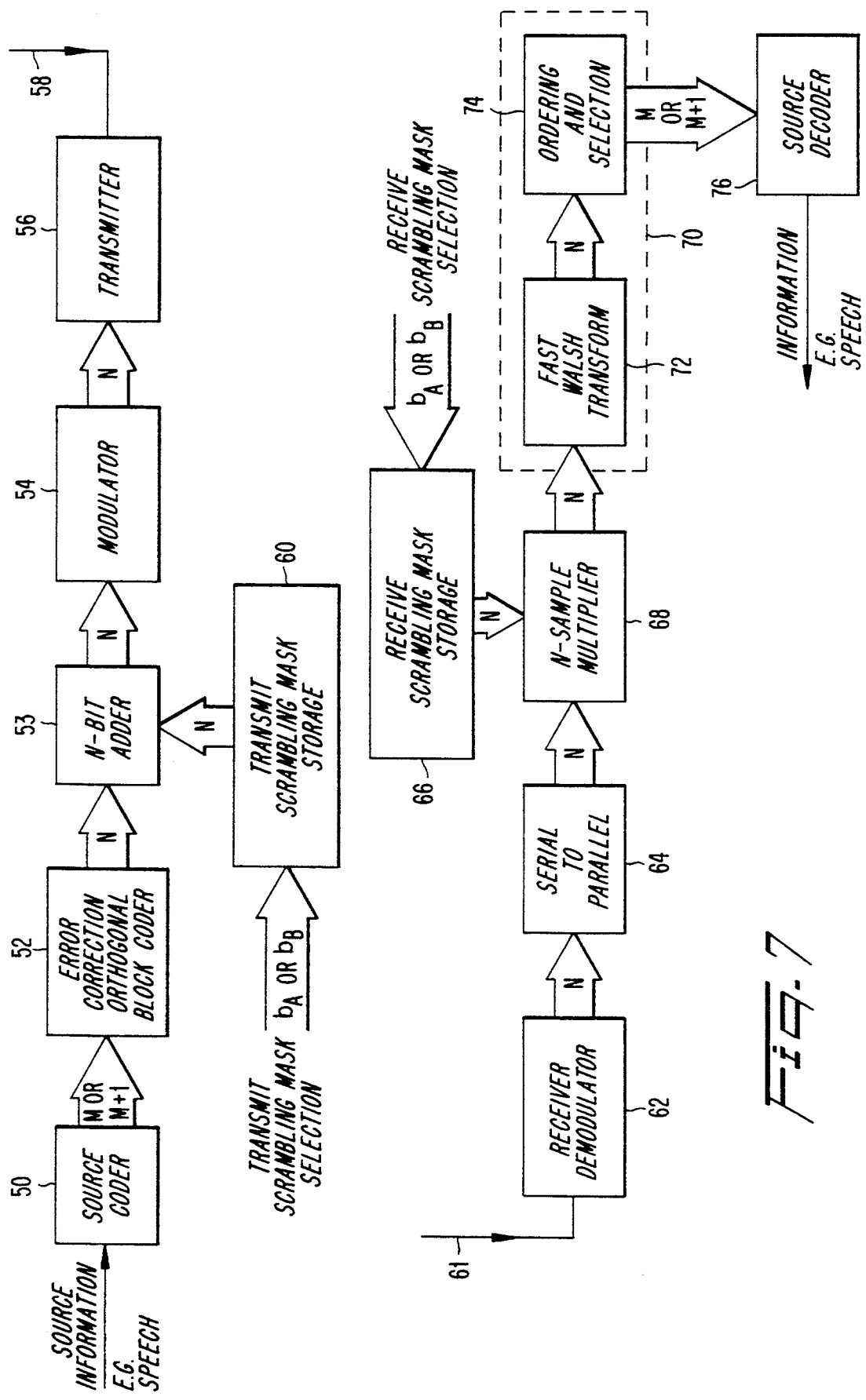
FIG. 7 is a functional block diagram of a system that may be used to implement one of the preferred embodiments of the present invention.

The present invention may be readily incorporated into a multiple access spread spectrum communications system by storing these scrambling masks in a look-up table in a RAM or ROM memory, for example, from which a particular mask is retrieved by supplying its associated address. A system for implementing the scrambling masks into a spread spectrum system is illustrated in FIG. 7. While described in terms of a memory look-up table, it will be appreciated that a suitable code generator, such as a digital logic circuit or microcomputer, that produces on-line the scrambling masks indicated by selection control input signals may also be used.

Source information, e.g., speech, is converted to blocks of M (or M+1) binary bits in a source coder 50, and these bit blocks are encoded by an error correction orthogonal (or bi-orthogonal) block coder 52. The orthogonal $2^M$-bit block codewords are scrambled by a modulo-2 N-bit adder 53 with a scrambling mask, constructed as described above, retrieved from a look-up table in a memory 60. In the case of ideal scrambling masks, there are either $n_A = N^{\frac{1}{2}}$ or $n_B = N/2$ scrambling masks, depending on which method was used to generate the scrambling mask set. Thus, the number of bits needed to address each mask from storage 60 is either $b_A = \log_2(n_A)$ or $b_B = \log_2(n_B)$, and by transmitting the $b_A$-bit or $b_B$-bit scrambling mask selection address associated with a particular scrambling mask to the memory 60, that mask is retrieved from storage and modulo-2 added to the block coded signal.

The ability selectively to address and retrieve a specific scrambling mask becomes important in determining the order in which signals are decoded from a received composite signal. For example, if stronger coded information signals are decoded first and removed from the composite signal before weaker signals are decoded, the scrambling masks must be ordered by the signal strength of their associated, coded information signals. In CDMA subtractive demodulation according to the patent applications incorporated by reference above, the scrambling mask corresponding to the strongest information signal would be selected for decoding. After that signal is removed, the scrambling mask corresponding to the next strongest information signal is selected and so forth until the weakest signal is decoded.

The masked block codewords from the N-bit adder 53 may be applied to a parallel-to-serial converter and modulator 54 where they are impressed on a radio frequency carrier. The modulated signal is amplified and transmitted via a transmitter 56 and antenna 58.

At the receiver, the composite signal received by an antenna 61 is provided to a receiver demodulator 62 that demodulates, samples, and digitizes the composite signal. A serial-to-parallel converter 64 converts the serial samples into parallel blocks of signal samples (which may be complex, corresponding to in-phase and quadrature signal components). The order in which each information signal is decoded in the receiver is determined by the receive scrambling mask selection address $b_A$ or $b_B$ applied to a scrambling mask memory 66. In a specialized N-sample multiplier 68, each of the N parallel samples buffered in the serial-to-parallel converter 64 is multiplied by +1 or −1, depending on the scrambling mask retrieved from the memory 66. One way to perform this multiplication is to exclusive-OR each bit of the digital sample with the corresponding scrambling mask bit. For example, if the first of the N digital samples is 1011 and the first scrambling mask bit corresponds to −1, then the first of the N output samples would be 0100. If the received samples are complex, different scrambling masks could be used for the in-phase and quadrature components.

The descrambled signals are decoded in a block decoder 70, which may include an FWT circuit 72. The index of the transform component having the largest correlation magnitude (bi-orthogonal code) or value (orthogonal code) is determined and selected as the decoded information by an ordering and selection circuit 74. A suitable device for determining the largest of a number of input values is described in co-pending, commonly assigned U.S. patent application Ser. No. 761,380 filed Sep. 18, 1991. For simplicity in this application, the term "magnitude" will be used to refer to correlations with both orthogonal and bi-orthogonal codes. The FWT circuit 72 would preferably operate on complex numbers when the demodulator 62 and converter 64 deliver complex signal samples, which is often the case when the phase of the received signal is not known. The decoded M or M+1 bits of information are received by a source decoder 76 for conversion into analog form, e.g. speech.

Using the scrambling masks generated as described above, interference from signals having scrambling masks different from the one selected at the receiver is distributed equally, at least in theory, over each of the FWT circuit's correlation outputs. Because no spurious peaks occur, the risk is minimized that an error will be made in determining the largest correlation as the decoded information.

Figure 8:
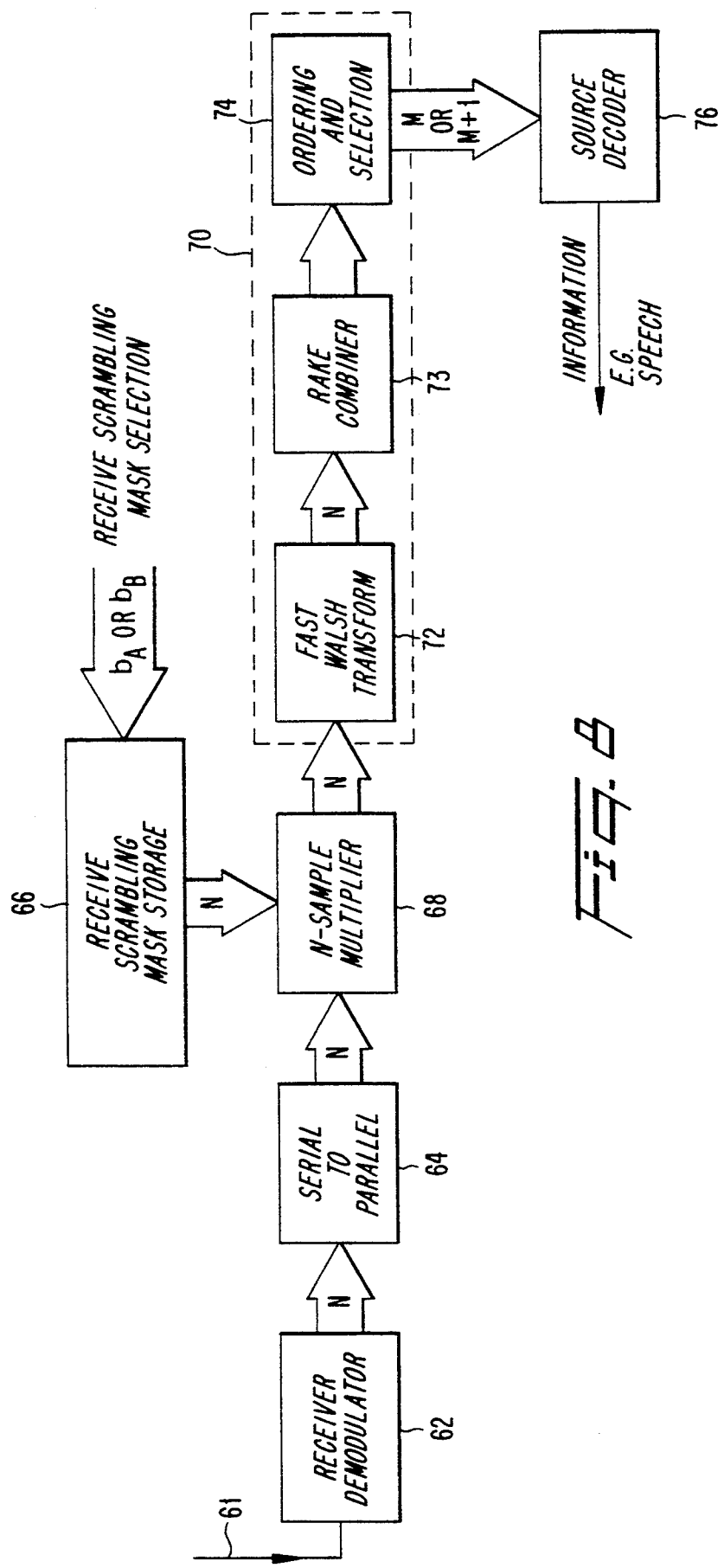
FIG. 8 is a block diagram of another receiver in accordance with the present invention.

In multiple access spread spectrum communications, it is not uncommon for the receiver to use the method of RAKE combining to combine correlations from different signal rays (i.e., to collect energy from a signal and its echoes). For the system shown in FIG. 7, this would appear as a RAKE combining element 73 between the FWT circuit 72 and the ordering and selection circuit 74 as illustrated in FIG. 8. For each of the N outputs of the FWT circuit, results from different signal times-of-arrival would be weighted and accumulated, before being sent to the ordering and selection circuit. Data corresponding to the different times-of-arrival would be provided by the serial-to-parallel converter 64. Furthermore, a new method, referred to as WRAKE combining, could be used in place of conventional RAKE combining. The RAKE combining technique and the new efficient WRAKE approach are detailed in co-pending, commonly assigned U.S. patent application Ser. No. 07/857,433 filed on Mar. 25, 1992, for "RAKE Receiver with Selective Ray Combining", which is expressly incorporated here by reference.

When the length N of the scrambling masks, or signature sequences, is an odd power of two (i.e., when $N = 2^{2Z-1}$ where $Z = 1, 2, 3, \ldots$), ideal correlation properties are not obtainable. In other words, it is impossible to construct the scrambling masks such that the sum of any two is a bent sequence, equally correlated in magnitude to all N Walsh-Hadamard codewords. In this case, however, one can use a "half-bent" sequence, which is a sequence that is equally correlated in magnitude to half of the N codewords and has zero correlation with the other half. Thus, it is possible to construct sets of scrambling masks such that the sum of any two is a half-bent sequence. A set of scrambling masks having this property may be called a "semi-ideal" set.

In accordance with the invention, two ways of constructing semi-ideal sets of scrambling masks are provided. In the first way, either Method A or Method B (the two Methods described above for creating ideal sets of scrambling masks) is used to generate a set of either $(N')^{\frac{1}{2}}$ or $N'/2$ scrambling masks, respectively, of length $N'$, where $N'=2N$ (where $N$ is an odd power of two). The modulo-2 sum of any two of these scrambling masks of length $N'$ would be a bent sequence, equally correlated in magnitude to $N'=2N$ codewords of length $N'=2N$. Then, the last half of each scrambling mask (which is $N$ bits long) is dropped, leaving masks of length $N'/2=N$. Therefore, the modulo-2 sum of any two of these truncated scrambling masks of length $N$ would be a sequence of length $N$ that could be equally correlated in magnitude to at most only $N'/4=N/2$ codewords of length $N'/2=N$. Thus, depending on which Method is used, a set of either $(2N)^{\frac{1}{2}}$ or $N$ scrambling masks of length $N$ is formed such that the sum of any two scrambling masks is half-bent.

In the second way of constructing semi-ideal sets of scrambling masks, either Method A or Method B above is again used to generate a set of either $(N')^{\frac{1}{2}}$ or $N'/2$ scrambling masks, respectively, of length $N'$, where $N'=N/2$ (where $N$ is an odd power of two). The modulo-2 sum of any two of these scrambling masks of length $N'$ would be a bent sequence, equally correlated in magnitude to $N'=N/2$ codewords of length $N'=N/2$. Then, for each $N'$ length sequence, a copy of itself is appended, giving masks of length $2N'=N$. Alternatively, it is also possible to append a copy of a different mask to each mask instead of appending to each a copy of itself. Therefore, the modulo-2 sum of any two of these duplicated scrambling masks of length $N$ would be a sequence of length $N$ that still could be equally correlated in magnitude to at most only $N'=N/2$ codewords of length $2N'=N$. Thus, depending on which Method is used, a set of either $(N/2)^{\frac{1}{2}}$ or $N/4$ scrambling masks of length $N$ is formed such that the sum of any two scrambling masks is half-bent.

For both cases of $N$ (i.e., $N$ either an even or odd power of two), the above methods may not yield large enough sets of scrambling masks. These sets can be augmented by more scrambling masks, but the modulo-2 sum of two such masks may no longer be a bent or half-bent sequence. However, these sets can advantageously be augmented so that the modulo-2 sum of any two masks is equally correlated in magnitude to at least some subset of the codewords. A sequence that is equally correlated in magnitude to a subset of the codewords and uncorrelated to the remaining codewords will be referred to as a "partially bent" sequence.

To augment ideal or semi-ideal sets of scrambling masks, two methods (Methods 1 and 2) may be employed. Both methods use special masks which are modulo-2 added to each scrambling mask in the original ideal or semi-ideal set. Each special mask produces another set of scrambling masks and these sets may be combined to form an augmented set of scrambling masks. If $U$ is the number of scrambling masks in the original ideal or semi-ideal set, then the number of masks in the augmented set is $SU$, where $S$ is the number of special masks. These special masks are formed by concatenating $P$ patterns of length $L$, where $PL=N$ and $P$ and $L$ are also powers of two.

In Method 1, there are two possible patterns: the all-zero pattern ($L$ zeroes), and the all-one pattern ($L$ ones). A set of $S_1$ scrambling masks with the length $P$ is formed, using either Method A or Method B (the two Methods described above for forming ideal sets of scrambling masks, which are also known as "good" sets of scrambling masks because of their "good" correlation properties, such as having minimal mutual cross-correlations between members of the sets). Each of these P-length scrambling masks is extended to an N-length special mask (complement mask) by replacing each "0" with the pattern of $L$ zeroes and replacing each "1" with the pattern of $L$ ones. Then the original set of $U$ scrambling masks of length $N$ is augmented to $S_1U$ masks by modulo-2 adding each special mask to the $U$ masks in the original set.

For example, consider the previous example set of four scrambling masks of 16-bit length created by Method A. To augment this set using method 1, a set of scrambling masks of length $P=4$ is needed. Using Method A for this set yields two masks: {0000}, and {0001}. Replacing each 0-bit with four zeroes and each 1-bit with four ones yields two special masks:

{0000 0000 0000 0000}
{0000 0000 0000 1111}.

Applying the first special mask to the original set gives the elements of the original set:

{0000 1010 0011 1001}
{0000 1100 0110 1010}
{0000 1001 0101 1100}
{0000 1111 0000 1111}.

Applying the second special mask to the original set gives the following elements of a new set:

{0000 1010 0011 0110}
{0000 1100 0110 0101}
{0000 1001 0101 0011}
{0000 1111 0000 0000}.

Thus, using both special masks, an augmented set of eight scrambling masks of 16-bit length is obtained.

In Method 2, each special mask consists of a single L-bit pattern repeated $P$ times. A set of $S_2$, scrambling masks with length $L$ is formed using either Method A or Method B. Each of these length $L$ masks is then repeated $P$ times, giving rise to $S_2$ special masks (pattern masks) of length $N$. As in Method 1, each special mask is modulo-2 added to the original set of $U$ scrambling masks to produce $U$ new scrambling masks. Thus, an augmented set of $S_2U$ scrambling masks is formed.

For example, consider again the previous example set of four scrambling masks of 16-bit length created by Method A. To augment this set using Method 2, a set of scrambling masks of length $L=4$ is needed. Again, using Method A for this set yields two masks: {0000}, and {0001}. Repeating each pattern $P=4$ times yields two special masks:

{0000 0000 0000 0000}
{0001 0001 0001 0001}.

Applying the first special mask to the original set gives the elements of the original set:

{0000 1010 0011 1001}
{0000 1100 0110 1010}
{0000 1001 0101 1100}
{0000 1111 0000 1111}.

Applying the second special mask to the original set gives the following elements of a new set:

{0001 1011 0010 1000}
{0001 1101 0111 1011}
{0001 1000 0100 1101}
{0001 1110 0001 1110}.

Thus, using both special masks, an augmented set of eight scrambling masks of 16-bit length is obtained.

It will be appreciated that Methods 1 and 2 advantageously can both be used together, either by combining them individually, yielding $S_1 + S_2$ special masks, or preferably by applying them to each other, yielding $S_1 S_2 = S_T$ special masks. Thus, as many as $S_T U$ scrambling masks, where U is the number of scrambling masks in the original set (Method A or B), can be generated.

For example, consider the special masks formed in the examples above. Applying the first special mask of Method 2 to both special masks of Method 1 gives both Method 1 special masks:

{0000 0000 0000 0000}
{0000 0000 0000 1111}.

Applying the second special mask of Method 2 to both special masks of Method 1 gives two new special masks:

{0001 0001 0001 0001}
{0001 0001 0001 1110}.

Thus, using both Methods 1 and 2, four special masks are obtained. In general, $S_1 S_2 > S_1 + S_2$, except when $S_1 = S_2 = 2$.

Applying the first special mask to the original set gives the original set:

{0000 1010 0011 1001}
{0000 1100 0110 1010}
{0000 1001 0101 1100}
{0000 1111 0000 1111}.

Applying the second special mask to the original set gives the new set (encountered in Method 1):

{0000 1010 0011 0110}
{0000 1100 0110 0101}
{0000 1001 0101 0011}
{0000 1111 0000 0000}.

Applying the third special mask to the original set gives the new set (encountered in Method 2):

{0001 1011 0010 1000}
{0001 1101 0111 1011}
{0001 1000 0100 1101}
{0001 1110 0001 1110}.

Applying the fourth special mask to the original set gives the new set (not yet encountered):

{0001 1011 0010 0111}
{0001 1101 0111 0100}
{0001 1000 0100 0010}
{0001 1110 0001 0001}.

A cellular communications system consists of base stations and users in each cell. For both uplink (user to base station) and downlink (base station to user) transmissions, interference from adjacent or nonadjacent cell signals can be minimized by carefully assigning different scrambling masks to the signals in different cells. The problem is analogous to frequency assignment or allocation in current cellular mobile radio systems.

There is some limited number of scrambling masks which form a set of scrambling masks having the desirable correlation properties. Of the total scrambling masks, there are subsets of scrambling masks which have good correlation properties, whereas correlation properties between masks of different subsets may not be as good. Also, if there are more signals than scrambling masks, the scrambling masks must be reused. To minimize interference, scrambling masks with "good" correlation properties (i.e., having the property that the average correlation of the sum of two scrambling masks to all possible codewords is minimal) should be used in close proximity (e.g., in the same cell or adjacent cells); those with correlation properties that are not as "good" (i.e., having the property that the average correlation of the sum of two scrambling masks to all possible codewords is more than minimal) should be used far apart (e.g., in nonadjacent cells). Correlation properties can include the average correlation to all possible codewords of the sum of two scrambling masks, where one of the masks has been shifted with respect to the other.

Detailed above are methods for generating augmented sets of SU scrambling masks, where S is the number of special masks used ($S = S_1$ or $S_2$ or $S_1 S_2$). In this way, there are S subsets of U masks each. Two masks from the same subset have better cross-correlation properties (i.e., the sum of the masks has, on average, lower correlations to all possible codewords) than two masks from different subsets.

This property can be exploited when allocating masks to different signals in a CDMA system. Signals in close proximity can be assigned masks from the same subset, whereas signals far apart can be assigned scrambling masks from different subsets.

For example, each cell in a cellular system can be allocated one of the S subsets of U masks. Signals within a certain cell are assigned a mask from that cell's allocated subset. Thus, interference is minimized within the cell, since each subset has optimal correlation properties (i.e., the sum of two scrambling masks is bent or half-bent). Therefore, within each cell, the scrambling masks available are of the form $s + u$, where s is one of the S special masks, u is one of the masks in the original set of U masks, and "+" denotes bit by bit modulo-2 addition. Thus, all masks used within a cell have the same special mask s, which can be thought of as a base station identification (ID) mask. The mask u can then be termed a user ID mask. Thus, by storing or generating S base station ID masks and U user ID masks, a transmitter or receiver can obtain any of the SU scrambling masks. This is usually more economical than storing or generating all SU masks individually.

For a first numerical example, suppose the mask length is N=128 bits. The above-mentioned second way of generating masks when N is an odd power of two together with Method B gives N/4=32 scrambling masks of 128-bit length. A single maximal-length sequence of 127-bit length, extended to 128 bits, can be added to all thirty-two scrambling masks. This gives one subset of U masks, where U=32.

Suppose this set is augmented using both complement masks (Method 1) and pattern masks (Method 2), using P patterns of length L each, such that $P \times L = N = 128$. For the complement masks (Method 1), suppose P is chosen to be sixteen and L is chosen to be eight. Using Method B, this gives P/2=8 complement masks. For the pattern masks (Method 2), suppose P is eight and L is sixteen. Using Method B, this gives L/2=8 pattern masks. Together, using both complement and pattern masks, this gives $8 \times 8 = 64$ special masks. Thus, there are sixty-four subsets of thirty-two masks each. Therefore, there are sixty-four different base station ID masks and thirty-two different user ID masks (U=32). If only eight base station ID masks are needed, then either pattern masks or complement masks can be used to give eight subsets of thirty-two different user ID masks each.

As a second numerical example with N=128, the above-mentioned first way of generating masks when N is an odd power of two together with Method A gives $(2N)^{\frac{1}{2}} = 16$ scrambling masks of 128-bit length. Using the same eight pattern masks and the same eight complement masks as in the first numerical example above, sixty-four different base station ID masks and sixteen different user (signal) ID masks can be obtained.

As another example, 512 scrambling masks can be formed using sixteen base station ID masks and thirty-two user ID masks. One set of thirty-two scrambling masks is allocated to at most thirty-two conversations taking place in a particular cell. Another set of thirty-two scrambling masks is allocated to at most thirty-two conversations taking place in an adjacent cell, and so on. In this way, up to sixteen different base stations/cells can be provided with enough masks unique to themselves for supporting up to thirty-two conversations each, all on the same frequency channel. Furthermore, it is possible to factorize the mask set into sixteen base station ID masks and thirty-two user ID masks such that every desired mask can be produced by bitwise modulo-2 adding a desired base station ID mask with a desired user ID mask, thereby reducing storage requirements from 512 masks to 16+32=48 masks.

In addition, in the case that cross-correlations between the masks are not all equally low, it is possible to choose each set of thirty-two masks used within the same cell, and therefore more likely to interfere with each other, to have the lowest mutual cross-correlations, while the cross-correlations with masks in different sets in different cells are allowed to have higher magnitudes. Which of the thirty-two user ID masks a particular mobile would use (in the case of a static, non-cycled allocation) would be conveyed to the mobile by the base station on call set-up. In the case of a pseudorandomly cycled mask allocation that is described below, the offset number to be used by a particular mobile would be conveyed by the base to the mobile at call set-up. The base ID mask in use by surrounding base stations would be conveyed by a base station to all mobiles in its cell by being broadcast on a broadcast channel. The base ID may be static, while the user ID mask selection that the base ID is combined with is cyclic. The reason for this is to permit a mobile station more easily to listen for fixed base ID codes in order to identify which bases it can hear.

In situations where N is an odd power of two or when more than either $n_A = N^{\frac{1}{2}}$ or $n_B = N/2$ scrambling masks are desired, it may not be possible to achieve the desirable Walsh spectrum flatness property. In that case, it may be preferable that the "non-flat" scrambling masks, which should be as "flat" as possible, be generated by numerical synthesis methods performed by a computer search. Using non-flat masks, it is desirable to average out an uneven distribution of interference correlations to avoid a particular pair of orthogonal codewords having more than the mean level of mutual interference or to avoid a particular codeword/information bit block from exhibiting a higher than average error rate. The effect of any unevenness may be reduced by cycling the selection of scrambling masks using a systematic or pseudorandom counter to select the masks, as described below.

It will be appreciated that such an approach is a form of code hopping, which is analogous to the idea of frequency hopping, and may be applied in any CDMA system that employs a fixed set of codes or signature sequences. Any CDMA system can be viewed as encoding an information signal into blocks of L code symbols. Each block is then impressed with a scrambling mask (i.e., signature sequence) of length L. For example, traditional CDMA effectively repeats each information bit L times (the encoding) then applies a scrambling mask of length L (either a sequence of length L or a subsequence of length L).

The method described below gives a form of orthogonal code hopping, where no two signals within the same group (e.g., cell or cluster of cells in a cellular system) use the same signature sequence at the same time. An alternative to orthogonal code hopping is semi-orthogonal code hopping, where hopping sequences are designed so that two signals within the same group rarely use the same signature sequence. This alternative is used when there are more signals than there are available signature sequences. A third alternative is random code hopping, where the signature sequence for each signal is chosen in a pseudorandom manner, independent of the other signals. Such an alternative is simpler to implement, but performance is degraded.

When the allocation of scrambling masks to signals is fixed, and the mutual correlation properties between the members of the set of scrambling masks are not flat (e.g., the modulo-2 sum of two members of the set is not a bent sequence), an adverse situation can arise where two signals having greater than the mean level of correlation between themselves interfere permanently with each other to a greater than mean extent. This situation can be prevented by time-varying or cycling the allocation of scrambling masks to signals in such a way that they each still receive a unique mask at any point in time but the signals exhibiting more than the mean level of correlation between each other are not always the same signals. For example, the interfering signal exhibiting strong correlation with a given signal may be a weaker signal at one instant and a stronger signal at another instant, but the interfering signal will thus not always be a stronger signal. Therefore, adverse interference situations are not permanent, but rather are transient. A colloquial description of the effect is to say that the misery is equally shared so that it is tolerable to all instead of being intolerable to some.

This desirable cyclic or time-varying allocation of scrambling masks to signals may be effected by generating a pseudorandom number as a function of a codeword counter. The pseudorandom number produced is the same at all transmitters and receivers. To guarantee that each transmitter-receiver selects a different scrambling mask at any time, this pseudorandom number is offset by zero for the first signal, by one for the second signal, and so forth using modulo-t addition, where t is the number of scrambling masks in the set. In this way t different signals can each be guaranteed a unique but time-varying choice of scrambling mask. The offset pseudorandom number may be used to address a memory containing the set of scrambling masks in order to extract the scrambling mask that applies at each moment. To give an even more random relation between the selections for different signals, the addressing order which maps each offset pseudorandom number to a particular scrambling mask may also be varied from instant to instant using another pseudorandom number. This variation may be accomplished by modulo adding this second pseudorandom number to the first offset pseudorandom number and/or by using the second pseudorandom number to permute the bits of the first offset pseudorandom number before they address the scrambling mask memory.

The present invention may be used in a cellular radio telephone communications system although those skilled in the art will recognize that the present invention may be used in other types of communication systems as well. In CDMA based cellular systems employing subtractive demodulation, each set of scrambling masks generated in accordance with the present invention provides for privately protected transmissions in each cell. In other words, even if one were to decode the composite signal using the appropriate orthogonal block codes, one would still need to know which scrambling masks are assigned to each mobile communication before the information signal could be descrambled. However, in order for each mobile station to decode its own signal from the received composite signal, it must be able to decode and remove stronger signals received for other mobiles within the cell. As a result of this subtractive decoding procedure, each mobile within a cell must know the scrambling masks assigned to all other mobiles communicating with the base station associated with the cell. In addition, these scrambling masks may be selected in a pseudorandom manner based on a code key available to all mobiles serviced by that particular cell. To prevent mobiles within the cell from listening in on other conversations, preferred embodiments of the present invention ensure private individual conversations by enciphering the individual information signal before it is block coded and scrambled. Only that mobile and the associated base station know that individual cipher key.

Figure 9:
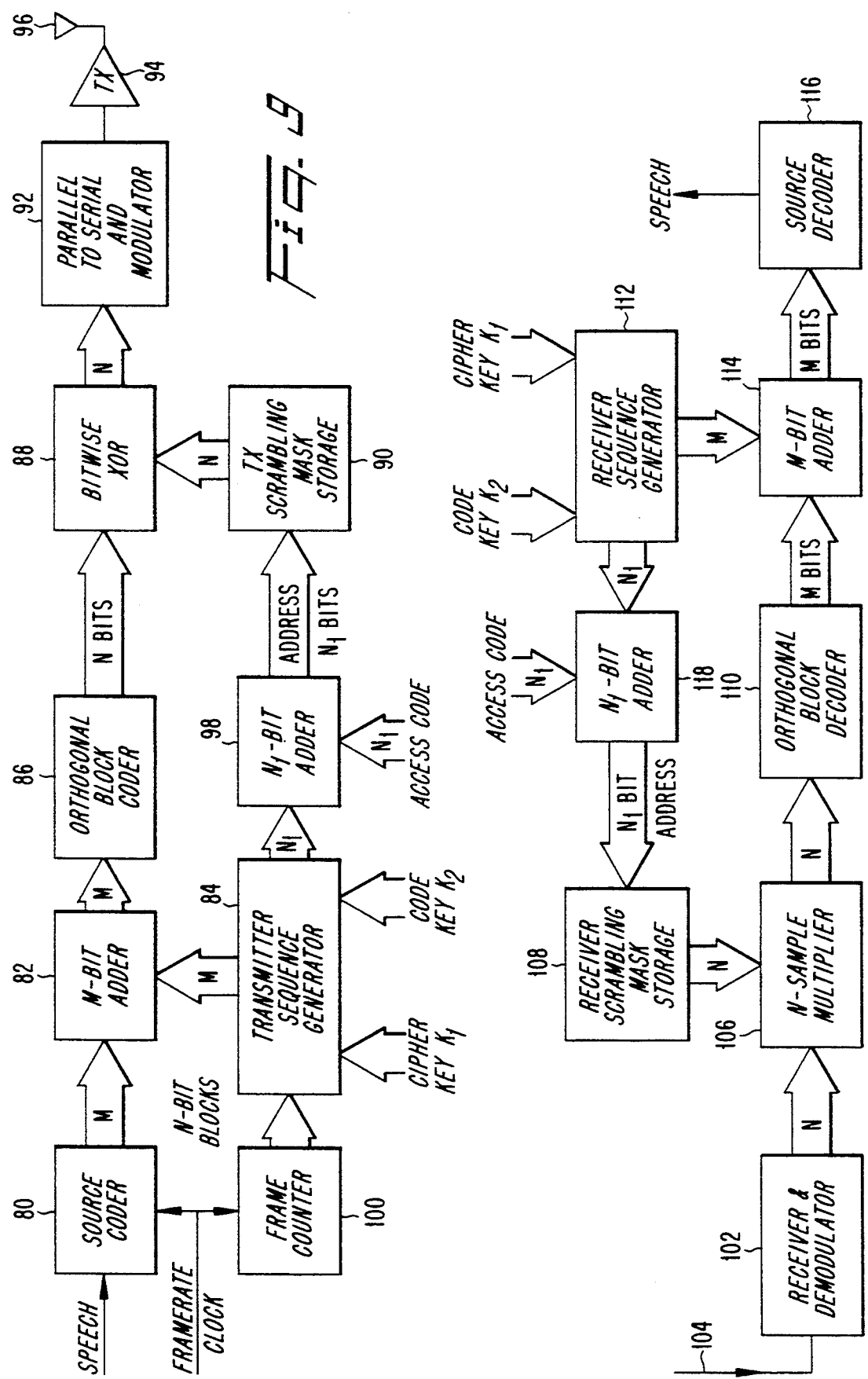
FIG. 9 is a functional block diagram of a system that may be used to implement another of the preferred embodiments of the present invention.

The system security and individual privacy features of the present invention will now be described in conjunction with FIG. 9. A source coder 80 converts speech information into digital form and assembles the information into blocks of M (or M+1) information bits for subsequent orthogonal (or bi-orthogonal) block coding. Only the M bit alternative is illustrated in FIG. 9, but the M+1 bit alternative is simply obtained by replacing M everywhere with M+1 in FIG. 9. Although not an essential aspect of this invention, the source coder 80 may also include conventional error correction coding capabilities. Before orthogonal coding, the M-bit (or (M+1)-bit) block is individually enciphered by modulo adding in an M-bit (or (M+1)-bit) adder 82 a unique enciphering bit sequence produced by a transmitter sequence generator 84.

The pseudorandom numbers produced as a function of a cipher key K1 and a code key K2 are combined with the information from the source encoder 80 by M-bit adder 82 to the produce enciphered information signals. These enciphered information signals are then spread-spectrum encoded using preferably orthogonal or bi-orthogonal block error-correction coding in an orthogonal block coder 86 before application of selected scrambling masks to the block codes in a bitwise exclusive-OR circuit 88.

The M-bit ciphered block is orthogonally (or bi-orthogonally) encoded in the orthogonal block coder 86 producing an N-bit encoded signal block ($N=2^M$ or $2^{M-1}$ for orthogonal or bi-orthogonal encoding, respectively) that is bitwise exclusive-OR'ed in the parallel exclusive-OR circuit 88 with a scrambling mask retrieved from a transmitter scrambling mask memory 90 and then converted to a serial bitstream and modulated on a radio carrier as represented in function block 92. The modulated signal is amplified by a suitable amplifier 94 and transmitted by an antenna 96.

The scrambling mask is selected from a look-up table of masks in memory 90 by applying an $N_1$-bit address to the scrambling mask memory 90. Thus, $N_1$ is the number of bits in the address to the scrambling mask memory 90, and $2^{N_1}$ is the maximum number of scrambling masks in the memory 90 that are uniquely addressable with an $N_1$-bit address. An important feature of this embodiment of the present invention is the cyclical or pseudorandom variation of the scrambling masks retrieved by a specific look-up table address. Thus, a unique scrambling mask must be generated and that mask selection procedure must be pseudorandomly varied. That table address is advantageously determined in part by the $N_1$-bit sequence called above code key K2. When an access code is received for selecting a particular scrambling mask, the code key K2 may be combined with the received access code using modulo arithmetic in $N_1$-bit adder 98.

The code key K2 is preferably not pseudorandomly generated, rather it is a constant that determines the operation of the pseudorandom number generator used for selecting scrambling masks. As described in more detail below, the code key K2 ensures that the actual scrambling mask address varies pseudorandomly for each mobile station. The adder 82 may be a bitwise exclusive-OR circuit or a modulo-2 M-bit adder or other equivalent circuit.

A modulo-2 adder may be modified to generate different cipher keys such as K1 by varying the number of bit-carry connections in the adder. All that is required is that each possible M-bit input block maps to a unique output block dependent on the cipher key K1 sequence and, as described below, the code key K2 sequence. Of course, the cipher key K1 is preferably unique to individual mobile stations to achieve the requisite privacy. The cipher key K1 may also change for each new M-bit input block so that cipher key K1 changes many times during a single conversation. The intended receiver must therefore synchronize its receiver sequence generator with the transmitter sequence generator 84.

Synchronization may be facilitated by driving the transmitter sequence generator 84 with a systematically varying time counter such as a frame counter 100. The receiver and transmitter then coordinate which frame or block number of the signal block is being decoded in order to synchronize operations. The details of obtaining initial frame counter agreement and maintaining it are not described here in detail because time-of-day synchronization of cipher systems is well known in the communications art.

The pseudorandom number generator 84 for scrambling mask selection randomizing is required to produce the same value in each of the transmitter-receivers requiring a mutually unique selection. They each are therefore in possession of the same system code key K2 which is advantageously a multi-bit digital control word on which depends the pseudorandom number sequences produced by the generator 84. This system code key K2 may be globally used in one cell, one network, one country, or all over, in which case it could be permanently built into the design of the pseudorandom number generator. Otherwise, means may be provided either for programming a mobile transmitter-receiver with or for receiving the code key K2 for a particular cell or network. Such means can include a physical connection of the mobile to a programming unit, inserting a module or code card into the mobile, acoustic connection of the mobile to a programming unit via an acoustic coupler to its microphone, or receiving information over the air from the network that is used in generating a network code key K2.

Because the code key K2 used for this purpose must be globally known by a number of a different users, it does not provide a high level of security against eavesdropping. Thus, a preferred system to protect against eavesdropping includes the cipher key K1 that is unique to each user.

Just as procedures may be required to establish a correct system code key K2 at the mobile station, the preferred implementation of user privacy with the aid of a unique user cipher key K1 requires procedures to establish the correct cipher key K1 at the base station for each user. These procedures can include the mobile station's identifying itself to the network by sending its ID code over the air; the network would then refer to a secret database wherein cipher keys are stored in correspondence with mobile ID codes to obtain the correct cipher key K1. It can also be advantageous for both the mobile and the network stations to combine such a retrieved key K1 with an extemporaneously generated pseudorandom number in order to produce a temporary cipher key K1 that is only used for one or a few conversations. The extemporaneously generated pseudorandom number may be transmitted from the network to the mobile station during a process of authenticating that the mobile is who it claims to be, as described in U.S. Pat. No. 5,091,942, which is expressly incorporated here by reference.

An advantage of selecting scrambling masks pseudorandomly is the avoidance of the adverse interference situation, mentioned above, where two signals in adjacent cells are inadvertently assigned scrambling masks that have a larger than mean mutual correlation, and the disposition of the mobile stations is such that interference is thereby caused and persists. With pseudorandom variation of the choice of scrambling mask, such an interference condition would only exist transiently, as on the next block code period those two scrambling masks would be allocated to a different pair of mobile stations with a different relative disposition.

The receiver portion of FIG. 9 has hardware analogous to the transmitter portion. A receiver/demodulator 102 receives a composite signal from an antenna 104, demodulates it to baseband frequency, and converts the serial signal into parallel signal samples or blocks of N bits. As described above, the signal samples may be complex, resulting from in-phase and quadrature components. These signal blocks are combined in a specialized N-sample multiplier 106 with an appropriately selected scrambling mask retrieved from a receiver scrambling mask storage device 108.

In the specialized N-sample multiplier 106 each of the N parallel samples provided by the receiver/demodulator 102 is multiplied by $+1$ or $-1$, depending on the scrambling mask provided by the storage device 108. Thus, a sample is either passed as is or negated. One way to perform this multiplication is to exclusive-OR each bit of the digital sample with the corresponding scrambling mask bit. For example, if the first of the N digital samples is 1011 and the first scrambling mask bit corresponds to $-1$, then the first of the N output samples would be 0100.

The descrambled signal produced by the multiplier 106 is decoded in an orthogonal block decoder 110 using, for example, the subtractive demodulation procedure described above. The decoded signal is descrambled by combining the appropriate cipher key K1 generated by a receiver sequence generator 112 with the decoded signal in an M-bit adder 114. Error correction codes are removed from the descrambled digital information in a source decoder 116, and the result is converted into speech.

In FIG. 9, the RAKE combining element that was described above in connection with FIG. 8 would be part of the orthogonal block decoder 110. Data corresponding to the different times-of-arrival would be provided by the receiver/demodulator 102.

The scrambling mask used in descrambling the received composite signal is determined in part by the code key K2 provided to the receiver sequence generator 112. The code key K2 is combined in an $N_1$-bit adder 118 with an access code chosen by the receiver system from a list of unused access codes as indicated by information broadcast by the system. The $N_1$-bit adder 118 generates the $N_1$-bit address applied to the receiver scrambling mask memory 108.

The receiver sequence generator 112 is arranged to generate the same pseudorandom $N_1$-bit sequence for all memory accesses by having the sequence depend only on code key K2 that is common to all scrambling mask storage accesses. The pseudorandom sequence for a particular memory access is generated by adding an offset to that access, modulo the number of stored scrambling masks as described above. This process is explained below in a different way.

Each mobile in a certain group is preferably allocated a unique scrambling mask. For example, if there are four scrambling masks M0, M1, M2, M3, they can be allocated to four signals S0, S1, S2, S3 as follows:

S0 gets M0
S1 gets M1
S2 gets M2
S3 gets M3.

Alternatively, they could be allocated in any one of twenty-three other ways such as:

S0 gets M2
S1 gets M0
S2 gets M3
S3 gets M1.

It is desirable to vary the allocation between these different ways pseudorandomly while still guaranteeing each signal a unique allocation. A first Method of randomizing the allocation is to generate, in each mobile transceiver, a pseudorandom number using the same recipe so that they all get the same pseudorandom number as a result. Let this number be 3 for example. Then each mobile transceiver adds a different offset, e.g., its own signal number, to this same pseudorandom number so that signal S0 adds 0 to 3 getting 3 (M3), signal S1 adds 1 to 3 getting 4, which is reduced modulo-4 to 0 (M0), signal S2 adds 2 to 3 getting 5 which reduces modulo-4 to (M1), and signal S3 adds 3 to 3 getting 6 which reduces modulo-4 to 2 (M2). Starting with other pseudorandom numbers 0–2, the possible allocations are:

| pseudorandom = | 3 | 0 | 1 | 2 |
|---|---|---|---|---|
| S0 gets | M3 | M0 | M1 | M2 |
| S1 gets | M0 | M1 | M2 | M3 |
| S2 gets | M1 | M2 | M3 | M0 |
| S3 gets | M2 | M3 | M0 | M1. |

These are only four out of the twenty-four possible ways in which the signals could have been allocated codes.

A second Method of randomizing the allocation may also be employed. This involves generating a second pseudorandom number which is modulo added to the offset, first pseudorandom number (which is the same as the mask number allocated as above). Bitwise modulo-2 addition can be chosen to illustrate the effect of this. The four possible 2-bit patterns 00, 01, 10, 11 may thus be bitwise modulo-2 added to the addresses (mask numbers) of the scrambling masks in the above giving the following possible allocations:

| | 00 | | | | 01 | | | |
|---|---|---|---|---|---|---|---|---|
| | 0 | 1 | 2 | 3 | 0 | 1 | 2 | 3 |
| S0 gets | M0 | M1 | M2 | M3 | M1 | M0 | M3 | M2 |
| S1 gets | M1 | M2 | M3 | M0 | M0 | M3 | M2 | M1 |
| S2 gets | M2 | M3 | M0 | M1 | M3 | M2 | M1 | M0 |
| S3 gets | M3 | M0 | M1 | M2 | M2 | M1 | M0 | M3 |

| | 10 | | | | 11 | | | |
|---|---|---|---|---|---|---|---|---|
| | 0 | 1 | 2 | 3 | 0 | 1 | 2 | 3 |
| S0 gets | M2 | M3 | M0 | M1 | M3 | M2 | M1 | M0 |
| S1 gets | M3 | M0 | M1 | M2 | M2 | M1 | M0 | M3 |
| S2 gets | M0 | M1 | M2 | M3 | M1 | M0 | M3 | M2 |
| S3 gets | M1 | M2 | M3 | M0 | M0 | M3 | M2 | M1 |

For example, to generate the eighth column from the fourth column, bitwise modulo-2 add 01 to the binary representation of the mask number in the fourth column. Thus, for signal S0, 11+01=10 modulo-2, so S0 gets M2, while for signal S1, 00+01=01 modulo-2, so S1 gets M1, and for signal S2, 01+01=00 modulo-2, so S2 gets M0, and for signal S3, 10+01=11 modulo-2, so S3 gets M3, and so forth.

Some of these patterns produced with two pseudorandom numbers are the same as the patterns produced with one pseudorandom number, but the number of different patterns has increased from four to eight.

A third Method of randomizing the allocation is to use further bits out of the pseudorandom number generator to control a permutation of the address bits. In the above, the only other permutation is obtained by reversing the order of the address bits so that 0 maps to 0, 1 maps to 2 and vice versa, and 3 maps to 3, giving the following patterns:

| | 00 | | | | 01 | | | |
|---|---|---|---|---|---|---|---|---|
| | 0 | 1 | 2 | 3 | 0 | 1 | 2 | 3 |
| S0 gets | M0 | M2 | M1 | M3 | M2 | M0 | M3 | M1 |
| S1 gets | M2 | M1 | M3 | M0 | M0 | M3 | M1 | M2 |
| S2 gets | M1 | M3 | M0 | M2 | M3 | M1 | M2 | M0 |
| S3 gets | M3 | M0 | M2 | M1 | M1 | M2 | M0 | M3 |

| | 10 | | | | 11 | | | |
|---|---|---|---|---|---|---|---|---|
| | 0 | 1 | 2 | 3 | 0 | 1 | 2 | 3 |
| S0 gets | M1 | M3 | M0 | M2 | M3 | M1 | M2 | M0 |
| S1 gets | M3 | M0 | M2 | M1 | M1 | M2 | M0 | M3 |
| S2 gets | M0 | M2 | M1 | M3 | M2 | M0 | M3 | M1 |
| S3 gets | M2 | M1 | M3 | M0 | M0 | M3 | M1 | M2 |

For example, to generate these sixteen allocations from the previous sixteen allocations, simply interchange M1 and M2 everywhere. This produces a further eight different patterns so that sixteen out of the possible twenty-four sets of allocations are now covered.

With a number of address bits greater than two, it is clear that a greater number of possibilities to randomize the selection exist, for example, by varying the modulus of the arithmetic used in adding the offset, the first pseudorandom number, and/or the second pseudorandom number.

It will be understood that a cipher machine generates pseudorandom numbers according to a recipe that depends on a secret code, or key, that is usually fixed for the length of a message or longer. The pseudorandom number stream still varies during the message, however. The sequence of pseudorandom numbers produced by the cipher machine is usually referred to as the "keystream", and the secret code that defines the recipe for producing the keystream is variously called the "key", "key variable", or "cipher variable". That part of the machine that generates the keystream from the key is called the "key generator". This is distinct from some other machine that produces pseudorandom, secret keys with which the cipher machine is programmed. To avoid confusion, this other machine would not also be called a "key generator", but a "key management unit". Keys produced by a key management unit may be transported to a cipher machine and then injected electronically using a "fill gun".

Sometimes in cellular systems, the key used to encipher a conversation is only used for that one conversation. It is then sometimes called the "conversation key" or "talk variable". Such a temporary key is produced by mixing the fixed key with a random number sent from one correspondent to the other, e.g., from base (network) to mobile. This is not desirable in the case of the pseudorandom generator that drives scrambling mask selection since it must produce the same sequence, before offsets, in all stations. However, the technique of generating a temporary conversation key could well be applicable to the pseudorandom number generator that ciphers the source coded information before CDMA spreading.

A further simple example is useful in illustrating how cyclic, pseudorandom scrambling mask addresses may be generated. If there are five scrambling masks designated (M0..., M4), a 3-bit address ($N_1 = 3$) may be used to select one of the five. If at a particular instant, the receiver sequence generator 112 produces an offset of two, an access code of zero is offset by two, resulting in the selection of scrambling mask number 2 (M2). Alternatively, an access code of 3 is offset to a scrambling mask address of 5. Because of the modulo-5 constraint, imposed because there are only 5 scrambling masks stored, the count number 5 is actually reset to count 0 so that access 3 results in a mask address 0 (M0). Likewise, access 1 offsets to address 3 (M3), access 2 offsets to address 4 (M4), and access 4 offsets to address 6 which is reset to 1 (M1), because of the modulo-5 constraint. Of course, the offset number varies pseudorandomly so that the addresses vary pseudorandomly.

If the number of scrambling masks is a power of two, i.e., $2^{N_1}$, then the $N_1$-bit adders 98, 118 can either be modulo-$2^{N_1}$ adders or bitwise modulo-2 adders (bitwise exclusive-OR). If the number of scrambling masks is a composite number (a product of factors, some or all of which can be the same or different) $L = n1 \cdot n2 \cdot n3 \cdot \ldots$, then the adder 98 may either be a modulo-L adder or a combination of modulo-n1, modulo-n2, modulo-n3, ... adders separately for each factor or radix. It is of course much simpler to generate pseudorandom sequences of numbers over a range that is a power of two.

From the discussion above, it will be appreciated that the use of scrambling masks can apply to control signals as well as user signals. In fact, it is sometimes desirable to use the fixed set of scrambling masks with optimal correlation properties for control signals only. The optimal correlation properties help to minimize interference between different control signals. In a cellular system, the correlation properties also help to minimize interference between control signals in nearby cells. These control signals or channels include broadcast, paging, synchronization, and pilot channels. The technique of using pseudorandom numbers to encipher the data or the address of a scrambling mask may or may not be used when the channel is a control channel.

It will be appreciated by those of ordinary skill in this art that the foregoing methods and functions can be carried out by appropriately arranged, general-purpose, digital signal processor circuits and components. For better efficiency, however, specialized application-specific integrated circuits (ASICs) are preferred.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. In a communications system for simultaneous communication of spectrally overlapping information signals, a transmitter comprising:

means for encoding individual information signals into blocks of codewords;

means for generating a scrambling mask for each codeword from a set of scrambling masks that have optimal correlation properties;

means for combining a different scrambling mask with each codeword to obtain uniquely scrambled codewords; and means for transmitting the scrambled codewords over a communication channel.

2. The transmitter of claim 1, wherein the modulo-2 sum of any one of said scrambling masks with any of the other masks in said set results in a sequence which is substantially equally correlated in magnitude to each of said codewords.

3. The transmitter of claim 2, wherein said substantially equal correlation corresponds to a substantially flat Walsh-Hadamard spectrum such that, after descrambling with the scrambling mask of a desired signal, interfering signals are substantially equally correlated in magnitude to all possible Walsh-Hadamard codewords.

4. The transmitter of claim 1, wherein said encoding means uses either orthogonal block codes or bi-orthogonal block codes.

5. The transmitter of claim 1, wherein said optimal correlation properties include the property that a modulo-2 sum of any one of said scrambling masks with any of the other masks in said set is a bent sequence.

6. The transmitter of claim 1, wherein said optimal correlation properties include the property that a modulo-2 sum of any two of said scrambling masks is a partially-bent sequence.

7. The transmitter of claim 1, wherein a modulo-2 sum of any two said scrambling masks is a sequence which is substantially equally correlated in magnitude to half of said codewords and has substantially zero correlation with the other half of said codewords.

8. The transmitter of claim 7, wherein said substantially equal correlation corresponds to a partially flat and partially zero Walsh-Hadamard spectrum.

9. The transmitter of claim 1, wherein a modulo-2 sum of any two of said scrambling masks is a sequence which is substantially equally correlated in magnitude to a subset of said codewords and has substantially zero correlation to the remaining codewords.

10. The transmitter of claim 9, wherein said substantially equal correlation corresponds to a partially flat and partially zero Walsh-Hadamard spectrum.

11. The transmitter of claim 1, wherein said scrambling masks are formed using either permutations of Walsh-Hadamard codewords, permutations of a set of Kerdock codewords, or a set of Kerdock codewords.

12. The transmitter of claim 11, wherein the set of scrambling masks includes a scrambling mask produced by adding a base sequence to another scrambling mask in the set.

13. The transmitter according to claim 11, wherein said scrambling mask for each codeword is a respective one of a second set of scrambling masks that have semi-ideal correlation properties, and the scrambling masks in the second set are formed by omitting the last halves of scrambling masks that have optimal correlation properties.

14. The transmitter according to claim 13, wherein the second scrambling mask set is enlarged by modulo-2 adding any of a set of special masks to each mask in the second set such that the enlarged second set of scrambling masks has good correlation properties.

15. The transmitter of claim 14, wherein said good correlation properties correspond to the modulo-2 sum of any two scrambling masks being substantially equally correlated in magnitude to a subset of the said codewords and the sum having substantially zero correlation with the remaining codewords.

16. The transmitter of claim 14, wherein the special masks are formed by concatenating small length sequences of either all zeros or all ones according to the way a good set of shorter length scrambling masks are formed, by substituting a small length sequence of all zeros for each zero in each scrambling mask in said good set and by substituting a small length of all ones for each one in each scrambling mask in said good set.

17. The transmitter of claim 14, wherein the special masks are formed by repeating a shorter length sequence, such that the shorter length sequence is any mask from a good set of shorter length scrambling masks.

18. The transmitter of claim 14, wherein the special masks are formed by forming all possible modulo-2 sums of
a first set of special masks formed by concatenating smaller length sequences of either all zeros or all ones according to the way a good set of shorter length scrambling masks are formed, by substituting a small length sequence of all zeros for each zero in each scrambling mask in said good set and by substituting a small length of all ones for each one in each scrambling mask in said good set, and
a second set of special masks formed by repeating a shorter length sequence, such that the shorter length sequence is any mask from a good set of shorter length scrambling masks.

19. The transmitter according to claim 11, wherein said scrambling mask for each codeword is a respective one of a second set of scrambling masks that have semi-ideal correlation properties, and the scrambling masks in the second set are formed by extending each scrambling mask that has optimal correlation properties with a copy of itself.

20. The transmitter according to claim 19, wherein the second scrambling mask set is enlarged by modulo-2 adding any of a set of special masks to each mask in the second set such that the enlarged second set of scrambling masks has good correlation properties.

21. The transmitter of claim 20, wherein said good correlation properties correspond to the modulo-2 sum of any two scrambling masks being substantially equally correlated in magnitude to a subset of the said codewords and the sum having substantially zero correlation with the remaining codewords.

22. The transmitter of claim 20, wherein the special masks are formed by concatenating small length sequences of either all zeros or all ones according to the way a good set of shorter length scrambling masks are formed, by substituting a small length sequence of all zeros for each zero in each scrambling mask in said good set and by substituting a small length of all ones for each one in each scrambling mask in said good set.

23. The transmitter of claim 20, wherein the special masks are formed by repeating a shorter length sequence, such that the shorter length sequence is any mask from a good set of shorter length scrambling masks.

24. The transmitter of claim 20, wherein the special masks are formed by forming all possible modulo-2 sums of
a first set of special masks formed by concatenating smaller length sequences of either all zeros or all ones according to the way a good set of shorter length scrambling masks are formed, by substituting a small length sequence of all zeros for each zero in each scrambling mask in said good set and by substituting a small length of all ones for each one in each scrambling mask in said good set, and
a second set of special masks formed by repeating a shorter length sequence, such that the shorter length sequence is any mask from a good set of shorter length scrambling masks.

25. The transmitter according to claim 11, wherein said scrambling mask for each codeword is a respective one of a second set of scrambling masks that have semi-ideal correlation properties, and the scrambling masks in the second set are formed by extending each scrambling mask that has optimal correlation properties with another scrambling mask that has optimal correlation properties.

26. The transmitter according to claim 25, wherein the second scrambling mask set is enlarged by modulo-2 adding any of a set of special masks to each mask in the second set such that the enlarged second set of scrambling masks has good correlation properties.

27. The transmitter of claim 26, wherein said good correlation properties correspond to the modulo-2 sum of any two scrambling masks being substantially equally correlated in magnitude to a subset of the said codewords and the sum having substantially zero correlation with the remaining codewords.

28. The transmitter of claim 26, wherein the special masks are formed by concatenating small length sequences of either all zeros or all ones according to the way a good set of shorter length scrambling masks are formed, by substituting a small length sequence of all zeros for each zero in each scrambling mask in said good set and by substituting a small length of all ones for each one in each scrambling mask in said good set.

29. The transmitter of claim 26, wherein the special masks are formed by repeating a shorter length sequence, such that the shorter length sequence is any mask from a good set of shorter length scrambling masks.

30. The transmitter of claim 26, wherein the special masks are formed by forming all possible modulo-2 sums of
a first set of special masks formed by concatenating smaller length sequences of either all zeros or all ones according to the way a good set of shorter length scrambling masks are formed, by substituting a small length sequence of all zeros for each zero in each scrambling mask in said good set and by substituting a small length of all ones for each one in each scrambling mask in said good set, and
a second set of special masks formed by repeating a shorter length sequence, such that the shorter length sequence is any mask from a good set of shorter length scrambling masks.

31. The transmitter of claim 11, wherein an original scrambling mask set is enlarged by modulo-2 adding any of a set of special masks to each mask in the original set such that the total set of scrambling masks has good correlation properties.

32. The transmitter of claim 31, wherein said good correlation properties correspond to the modulo-2 sum of any two scrambling masks being substantially equally correlated in magnitude to a subset of the said codewords and the sum having substantially zero correlation with the remaining codewords.

33. The transmitter of claim 31, wherein the special masks are formed by concatenating small length sequences of either all zeros or all ones according to the way a good set of shorter length scrambling masks are formed, by substituting a small length sequence of all zeros for each zero in each scrambling mask in said good set and by substituting a small length of all ones for each one in each scrambling mask in said good set.

34. The transmitter of claim 31, wherein the special masks are formed by repeating a shorter length sequence, such that the shorter length sequence is any mask from a good set of shorter length scrambling masks.

35. The transmitter of claim 31, wherein the special masks are formed by forming all possible modulo-2 sums of a first set of special masks formed by concatenating smaller length sequences of either all zeros or all ones according to the way a good set of shorter length scrambling masks are formed, by substituting a small length sequence of all zeros for each zero in each scrambling mask in said good set and by substituting a small length of all ones for each one in each scrambling mask in said good set, and a second set of special masks formed by repeating a shorter length sequence, such that the shorter length sequence is any mask from a good set of shorter length scrambling masks.

36. In a communications system for simultaneous communication of coded, scrambled, spectrally overlapping information signals, a receiver comprising:

means for receiving a composite signal including a plurality of said overlapping information signals;

means for combining a selected scrambling mask with said composite signal to generate a descrambled signal;

means for decoding said descrambled signal, including means for correlating the descrambled signal with a set of codewords to produce a correlation spectrum; and means for identifying a correlation component in said correlation spectrum having a greatest magnitude and extracting said correlation component as a decoded information signal, wherein the selected scrambling mask is a bit sequence having a length equal to the lengths of the codewords.

37. The receiver of claim 36, further comprising means for combining a plurality of correlation spectra produced by the decoding means to produce a combined correlation spectrum, wherein the identifying and extracting means identifies a correlation component in said combined correlation spectrum having a greatest magnitude and extracts said correlation component as a decoded information signal.

38. A communications system for simultaneous communication of a plurality of coded, scrambled, spectrally overlapping information signals, comprising:

means for encoding individual information signals into blocks of codewords using error correction codes;

means for generating a scrambling mask for each coded information signal from a set of scrambling masks that have optimal correlation properties;

means for combining a different scrambling mask with each codeword to obtain a uniquely scrambled codeword;

means for transmitting uniquely scrambled codewords over a communication channel;

means for receiving a composite signal including a plurality of said uniquely scrambled codewords;

means for combining a selected scrambling mask with said composite signal to generate a descrambled signal;

means for decoding said descrambled signal including means for correlating the descrambled signal with the error correction codewords to produce a correlation spectrum; and means for identifying a correlation component in said correlation spectrum having a greatest magnitude and extracting said correlation component as a decoded information signal.

39. The communications system of claim 38, further comprising means for combining a plurality of correlation spectra produced by the decoding means to produce a combined correlation spectrum, wherein the identifying and extracting means identifies a correlation component in said combined correlation spectrum having a greatest magnitude and extracts said correlation component as a decoded information signal.

40. The communications system of claim 38, wherein the generating means comprises first means for generating pseudorandom numbers corresponding to the coded information signals and first means for producing the set of scrambling masks based on the pseudorandom numbers, and wherein the selected scrambling mask combining means comprises second means for generating a pseudorandom number corresponding to a coded information signal and means for producing the scrambling mask corresponding to the coded information signal based on that pseudorandom number.

41. The communications system of claim 40, wherein the generating means generates sequences of scrambling masks for the coded information signals, and the first means generates sets of pseudorandom numbers, the pseudorandom number sets corresponding to respective coded information signals, and the first producing means produces the sequences of scrambling masks, the mask sequences corresponding to respective pseudorandom number sets and being mutually different, and wherein the scrambling mask combining means combines a selected sequence of scrambling masks with said composite signal to generate a descrambled signal, the second means generating a set of pseudorandom numbers and the producing means producing the selected sequence of scrambling masks based on that pseudorandom number set.

42. The communications system of claim 41, wherein the mask sequences are mutually different in each sequence member such that the coded information signals are combined with different scrambling masks at all times.

43. A method for simultaneously transmitting a plurality of spectrally overlapping information signals comprising the steps of:

(a) digitizing an information signal;

(b) encoding blocks of binary digits of the digitized information signal into codewords;

(c) producing a set of scrambling masks having optimal correlation properties;

(d) combining a selected scrambling mask with a codeword to obtain a scrambled codeword; and (e) transmitting said scrambled codewords over a communications channel.

44. The method of claim 43, wherein the codewords are orthogonal block codewords.

45. The method of claim 43, wherein said producing step (c) comprises the step of retrieving from a memory a scrambling mask associated with said coded information signal.

46. The method of claim 45, further comprising the steps of:
generating a pseudorandom number;
offsetting a scrambling mask address with said pseudorandom number; and
retrieving said selected scrambling mask from the memory using said offset scrambling mask address.

47. The method of claim 43, further comprising the steps of:
generating a pseudorandom number; and
combining said pseudorandom number with said digitized information signal, wherein each information signal is associated with a unique pseudorandom number.

48. The method of claim 43, wherein said set of scrambling masks is formed by forming all possible modulo-2 sums of a first set of scrambling masks and a second set of scrambling masks.

49. The method of claim 48, wherein producing said scrambling masks includes:
storing said first and second sets of scrambling masks in a memory, and
retrieving from said memory two scrambling masks, one from each set, and modulo-2 summing the two retrieved masks to form a single scrambling mask which is associated with said coded information signal.

50. The method of claim 48, wherein geographic regions are divided into cells such that nearby cells use different scrambling masks, and wherein each cell employs scrambling masks formed by the sum of any mask from said first set of scrambling masks with a single scrambling mask taken from said second set of scrambling masks, and the single scrambling mask is unique for the cell.

51. The method of claim 48, wherein geographic regions are divided into cells such that nearby cells use different scrambling masks, and wherein each cell employs scrambling masks formed by the sum of any mask from one scrambling mask set with a single scrambling mask taken from another scrambling mask set, and the single scrambling mask is unique for a set of geographically separated cells.

52. The method of claim 43, wherein geographic regions are divided into cells such that nearby cells use different scrambling masks.

53. A method for simultaneously receiving a plurality of spectrally overlapping information signals comprising the steps of:
(a) receiving a composite signal including a plurality of coded information signals;
(b) combining a selected one of a plurality of scrambling masks with said composite signal to generate a descrambled signal; and
(c) decoding said descrambled signal by correlating the descrambled signal with a plurality of error correction codewords to generate a correlation spectrum; identifying a correlation component in said spectrum having a greatest magnitude; and extracting said correlation component as a decoded information signal,
wherein the selected scrambling mask is a bit sequence having a length equal to the lengths of the error correction codewords.

54. The method of claim 53, wherein the decoding step comprises combining a plurality of correlation spectra to produce a combined correlation spectrum, and a correlation component in said combined correlation spectrum having a greatest magnitude is identified and extracted as a decoded information signal.

55. A method for simultaneously communicating a plurality of spectrally overlapping information signals comprising the steps of:
(a) converting an information signal into digital format;
(b) encoding blocks of binary digits of the information signal into codewords;
(c) producing a set of scrambling masks having optimal correlation properties;
(d) combining a selected scrambling mask with a codeword to obtain a scrambled codeword;
(e) transmitting said scrambled codewords over a communications channel;
(f) receiving a composite signal including a plurality of the scrambled codewords;
(g) combining a selected scrambling mask with said composite signal to generate a descrambled signal; and
(h) decoding said descrambled signal by correlating the descrambled signal with the codewords to generate a correlation spectrum; identifying a correlation component in said spectrum having a greatest magnitude; and extracting said correlation component as a decoded information signal.

56. The method according to claim 55, wherein the selected scrambling mask is selected based on a pseudorandom number.

57. The method according to claim 55, further comprising the step of adding a pseudorandom number associated with said decoded signal to said decoded signal after said identifying step, to generate a desired information signal.

58. The method of claim 55, wherein the decoding step comprises combining a plurality of correlation spectra to produce a combined correlation spectrum, and a correlation component in said combined correlation spectrum having a greatest magnitude is identified and extracted as a decoded information signal.

59. In a communications system for simultaneously communicating a plurality of spectrally overlapping signals, a transmitter comprising:
means for converting a signal into blocks of M binary digits;
means for generating a first pseudorandom number associated with a block and for generating a second pseudorandom number;
first means for combining said first pseudorandom number with said blocks to obtain an enciphered signal;
means for encoding said enciphered signal using block codes to obtain a codeword;
means for storing a set of scrambling masks having optimal correlation properties;
means for offsetting said second pseudorandom number to obtain a scrambling mask address;

means for retrieving a scrambling mask from said storing means based on said scrambling mask address;

second means for combining said retrieved scrambling mask with said codeword to obtain a scrambled codeword; and means for transmitting said scrambled codeword over a communications channel.

60. The transmitter of claim 59, wherein the block codes are orthogonal block codes.

61. The transmitter of claim 59, wherein said second pseudorandom number depends on the block and on a multi-bit digital control signal.

62. The transmitter of claim 59, wherein said first and second combining means are modulo adders.

63. The transmitter of claim 59, wherein the set of scrambling masks is such that correlation of any one of said scrambled codewords with a set of scrambled codewords scrambled with a different scrambling mask results in a correlation spectrum having a substantially even distribution of energy.

64. The transmitter of claim 63, wherein said correlation spectrum having a substantially even distribution is a substantially flat Walsh spectrum.

65. In a communications system for simultaneously communicating a plurality of spectrally overlapping signals, a receiver comprising:

means for receiving a composite signal including a plurality of said overlapping information signals;

means for generating a scrambling mask address and for retrieving a scrambling mask from a memory based on the scrambling mask address;

means for combining said retrieved scrambling mask with said composite signal to generate a descrambled signal;

means for transforming said descrambled signal using error correction codewords to generate a correlation spectrum;

means for identifying a correlation component in said correlation spectrum having a greatest magnitude as a decoded information signal; and means for deciphering said decoded information signal using a pseudorandom number associated with the information signal, wherein the retrieved scrambling mask is a bit sequence having a length equal to the lengths of the error correction codewords.

66. The receiver of claim 65, further comprising means for combining a plurality of correlation spectra produced by the decoding means to produce a combined correlation spectrum, wherein the identifying and extracting means identifies a correlation component in said combined correlation spectrum having a greatest magnitude and extracts said correlation component as a decoded information signal.

67. A communications system for simultaneously communicating a plurality of spectrally overlapping signals, comprising:

means for converting a signal into blocks of M binary digits;

means for generating a first pseudorandom number associated with a signal block and a second pseudorandom number;

first means for combining said first pseudorandom number with said signal block to obtain an enciphered signal;

means for encoding said enciphered signal using block codes to obtain a codeword;

means for storing a set of scrambling masks having optimal correlation properties;

means for offsetting said second pseudorandom number to obtain a scrambling mask address;

means for retrieving a scrambling mask from said storing means based on said address;

second means for combining said retrieved scrambling mask with said codeword to obtain a scrambled codeword;

means for transmitting said scrambled codeword over a communications channel;

means for receiving a composite signal including a plurality of said overlapping information signals;

means for generating said scrambling mask address;

means for combining said retrieved scrambling mask with said composite signal to generate a descrambled signal;

means for transforming said descrambled signal using error correction codewords to generate a correlation spectrum;

means for identifying a correlation component in said spectrum having a greatest magnitude as a decoded information signal; and means for deciphering said decoded signal using said first pseudorandom number.

* * * * *